US011099532B2

(12) United States Patent
Vitullo et al.

(10) Patent No.: US 11,099,532 B2
(45) Date of Patent: *Aug. 24, 2021

(54) CENTRAL PLANT CONTROL SYSTEM WITH BUILDING ENERGY LOAD ESTIMATION

(71) Applicant: Johnson Controls Technology Company, Auburn Hills, MI (US)

(72) Inventors: Steven R. Vitullo, Milwaukee, WI (US); Graeme Willmott, West Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,701

(22) Filed: Jun. 24, 2019

(65) Prior Publication Data

US 2019/0312429 A1 Oct. 10, 2019

Related U.S. Application Data

(63) Continuation of application No. 14/971,813, filed on Dec. 16, 2015, now Pat. No. 10,452,034.

(51) Int. Cl.
*G05B 13/04* (2006.01)
*H02J 3/00* (2006.01)

(52) U.S. Cl.
CPC ......... *G05B 13/048* (2013.01); *G05B 13/04* (2013.01); *H02J 3/00* (2013.01); *H02J 3/003* (2020.01); *H02J 2203/20* (2020.01)

(58) Field of Classification Search
None
See application file for complete search history.

(56) References Cited

U.S. PATENT DOCUMENTS

| | | | |
|---|---|---|---|
| 7,580,775 B2 | 8/2009 | Kulyk et al. | |
| 7,894,946 B2 | 2/2011 | Kulyk et al. | |
| 8,527,108 B2 | 9/2013 | Kulyk et al. | |

(Continued)

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.

(Continued)

*Primary Examiner* — Santosh R Poudel
(74) *Attorney, Agent, or Firm* — Foley & Lardner LLP

(57) ABSTRACT

Predictor variables that affect production or consumption of a resource are sampled at a plurality of times within a time period and aggregated to generate an aggregated value for each predictor variable over the time period. A model is generated which estimates the production or consumption in terms of the predictor variables. A regression process is performed to generate values for a plurality of regression coefficients in the model based on a cumulative production or consumption of the resource for the time period and the aggregated values. The sampled values of the predictor variables are then applied as inputs to the model to estimate productions or consumptions of the resource at each of the plurality of times. The estimated productions or consumptions may be used as inputs to a controller that operates equipment.

20 Claims, 10 Drawing Sheets

(56) References Cited

U.S. PATENT DOCUMENTS

| | | | |
|---|---|---|---|
| 8,527,109 B2 | 9/2013 | Kulyk et al. | |
| 8,903,554 B2 | 12/2014 | Stagner | |
| 8,918,223 B2 | 12/2014 | Kulyk et al. | |
| 9,110,647 B2 | 8/2015 | Kulyk et al. | |
| 9,429,923 B2 | 8/2016 | Ward et al. | |
| 9,703,339 B2 | 7/2017 | Kulyk et al. | |
| 10,139,877 B2 | 11/2018 | Kulyk et al. | |
| 2004/0095237 A1* | 5/2004 | Chen | H02J 13/0086 340/506 |
| 2007/0203860 A1* | 8/2007 | Golden | G05B 15/02 705/412 |
| 2012/0278038 A1 | 11/2012 | An et al. | |
| 2012/0330626 A1 | 12/2012 | An et al. | |
| 2013/0060391 A1* | 3/2013 | Deshpande | G05D 23/1924 700/291 |
| 2013/0110297 A1 | 5/2013 | Reichmuth et al. | |
| 2014/0058572 A1 | 2/2014 | Stein et al. | |
| 2015/0006127 A1 | 1/2015 | An et al. | |
| 2015/0277467 A1 | 10/2015 | Steven et al. | |
| 2015/0316901 A1 | 11/2015 | Wenzel et al. | |
| 2015/0316902 A1 | 11/2015 | Wenzel et al. | |
| 2015/0316903 A1 | 11/2015 | Asmus et al. | |
| 2015/0316907 A1 | 11/2015 | Elbsat et al. | |
| 2015/0316946 A1 | 11/2015 | Wenzel et al. | |
| 2015/0331023 A1 | 11/2015 | Hwang et al. | |
| 2016/0154417 A1* | 6/2016 | Sloop | G05B 13/02 700/291 |

OTHER PUBLICATIONS

Chan, W. S., "Disaggregation of Annual Time-Series Data to Quarterly Figures: A Comparative Study," Journal of Forecasting, vol. 12, No. 8, Dec. 1993, 12 pages.

Diederik Kingma and Jimmy Ba. Adam: A Method for Stochastic Optimization. In International Conference on Learning Representations (ICLR), 2015, 15 pages.

George EP Box, Gwilym M Jenkins, Gregory C Reinsel, and Greta M Ljung. Time Series Analysis: Forecasting and Control. John Wiley & Sons, 2015, chapters 13-15. 82 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor. System Identification: Theory for the User (2nd Edition). Prentice Hall, Upper Saddle River, New Jersey, 1999, chapters 5 and 7, 40 pages.

Marcellino, M. "Temporal Disaggregation, Missing Observations, Outliers, and Forecasting: A Unifying Non-Model Based Procedure," Advances in Econometrics, vol. 13, 1998, 44 pages.

Moritz Hardt, Tengyu Ma, and Benjamin Recht. Gradient Descent Learns Linear Dynamical Systems. arXiv preprint arXiv:1609.05191, 2016, 44 pages.

Nevena et al. Data center cooling using model-predictive control, 10 pages. 2018.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Vituello, et al., "An Algorithm for Disaggregating Temporal Natural Gas Consumption," Canadian Applied Mathematics Quarterly, vol. 21, No. 3, Fall 2013, 20 pages.

Vitullo, et al. "Mathematical Models for Natural Gas Forecasting," Canadian Applied Mathematics Quarterly, vol. 17, No. 7, Winter 2009, 22 pages.

Vitullo, S. "Disaggregating Interval Time-Series Data Applied to Natural Gas Flow Estimation," M.S. thesis, Department of Electrical and Computer Engineering, Marquette University, May 2007, Milwaukee WI, 90 pages.

Vitullo, S. "Disaggregating Time Series Data for Energy Consumption by Aggregate and Individual Customer," Dissertations (2009-), Paper 169, Marquette University, Dec. 2011, Retrieved from the internet at http://epublications.marquette.edu/dissertations_mu/169 on Dec. 17, 2015, 151 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

* cited by examiner

CENTRAL PLANT CONTROL SYSTEM WITH BUILDING ENERGY LOAD ESTIMATION

CROSS-REFERENCE TO RELATED PATENT APPLICATION

This application is a continuation of U.S. patent application Ser. No. 14/971,813 filed Dec. 16, 2015, the entire disclosure of which is incorporated by reference herein.

BACKGROUND

The present disclosure relates generally to the operation of a central plant for serving building thermal energy loads. The present disclosure relates more particularly to systems and methods for distributing building thermal energy loads across a plurality of subplants configured to serve the building thermal energy loads. The present disclosure relates more particularly still to systems and methods for estimating hourly heating and cooling loads for a building to facilitate operation of a central plant.

A central plant may include various types of equipment configured to serve the thermal energy loads of a building or campus (i.e., a system of buildings). For example, a central plant may include heaters, chillers, heat recovery chillers, cooling towers, or other types of equipment configured to provide heating or cooling for the building. A central plant may consume resources from a utility (e.g., electricity, water, natural gas, etc.) to heat or cool a working fluid (e.g., water, glycol, etc.) that is circulated to the building or stored for later use to provide heating or cooling for the building.

Modern energy conservation measures (ECM) include optimizing the dispatch of a central energy facility (CEF) to use equipment at optimal times of the day when efficiencies are higher, combined with adding thermal energy storage to reduce the peak energy demand during the day. In order to verify the effectiveness of an ECM, a baseline model must be created to find the initial cost of running the CEF. This cost is then compared to the cost of an optimized plant with new equipment added, and the capital savings is the difference between these numbers. Performance contracts rely on the ability to accurately create the baseline model, as well as the projected savings. The resolution of the optimized dispatch schedule is dependent on the resolution of the data input to an optimization tool; however, many facilities do not collect data at hourly intervals. Instead, some facilities collect data at daily and monthly intervals.

SUMMARY

One implementation of the present disclosure is a system for operating equipment to control a production or consumption of a resource, according to some embodiments. In some embodiments, the system includes a processing circuit configured to identify a predicted cumulative production or consumption of a resource for a future time period and sample values of multiple predictor variables that affect the production or consumption of the resource at multiple times within the future time period. In some embodiments, the processing circuit is configured to aggregate the values of the predictor variables to generate an aggregated value for each of the predictor variables over the future time period. In some embodiments, the processing circuit is configured to generate a model that estimates the production or consumption in terms of the predictor variables based on the cumulative production or consumption of the resource and the aggregated values for each of the predictor variables. In some embodiments, the processing circuit is configured to input, to the model, the values of the predictor variables sampled at each of the times within the future time period to estimate a production or consumption of the resource at each of the times within the future time period such that the predicted cumulative production or consumption of the resource for the future time period is disaggregated into estimated productions or consumptions of the resource within the future time period. In some embodiments, the system includes a controller configured to operate equipment using the estimated productions or consumptions of the resource at each of the times.

In some embodiments, the processing circuit is further configured to determine a number of the multiple times that occur within the future time period. In some embodiments, the processing circuit is configured to sum each of the values of the predictor variables sampled during the number of the multiple times to aggregate the multiple predictor variable values.

In some embodiments, the processing circuit is further configured to select the predictor variables based on an effect of each of the predictor variables on the production or consumption of the resource.

In some embodiments, the processing circuit is further configured to generate a regression model based on the predicted cumulative productions or consumptions of the resource identified.

In some embodiments, the production or consumption of the resource is a heating load.

In some embodiments, the time period is one month.

In some embodiments, the production or consumption of the resource is a cooling load.

In some embodiments, the future time period is one day.

Another implementation of the present disclosure is a method for operating equipment to control a production or consumption of a resource, according to some embodiments. In some embodiments, the method includes identifying a predicted cumulative production or consumption of a resource for a future time period and sampling values of multiple predictor variables that affect the production or consumption of the resource at multiple times within the future time period. In some embodiments, the method includes aggregating the values of the multiple predictor variables to generate an aggregated value for each of the multiple predictor variables over the future time period. In some embodiments, the method includes generating a model that estimates the production or consumption in terms of the predictor variables based on the cumulative production or consumption of the resource and the aggregated values for each of the multiple predictor variables. In some embodiments, the method includes inputting, to the model, the values of the multiple predictor variables sampled at each of the multiple times within the future time period to estimate a production or consumption of the resource at each of the multiple times within the future time period such that the predicted cumulative production or consumption of the resource for the future time period is disaggregated into multiple estimated productions or consumptions of the resource within the future time period. In some embodiments, the method includes operating equipment using the estimated productions or consumptions of the resource at each of the multiple times.

In some embodiments, aggregating the values of the multiple predictor variables includes determining a number of the multiple times that occur within the future time period, and summing each of the values of the multiple predictor variables sampled during the number of the multiple times.

In some embodiments, the method includes selecting the predictor variables based on an effect of each of the predictor variables on the productions or consumptions of the resource.

In some embodiments, the performing the regression process includes generating a model based on the predicted cumulative productions or consumptions of the resource identified.

In some embodiments, the production or consumption of the resource is a heating load.

In some embodiments, the future time period is one month.

In some embodiments, the production or consumption of the resource is a cooling load.

In some embodiments, the future time period is one day.

Another implementation of the present disclosure is a processing circuit for operating equipment to control a production or consumption of a resource, according to some embodiments. In some embodiments, the processing circuit is configured to identify a predicted cumulative production or consumption of a resource for a future time period and sample values of multiple predictor variables that affect the production or consumption of the resource at multiple times within the future time period. In some embodiments, the processing circuit is configured to aggregate the values of the multiple predictor variables to generate an aggregated value for each of the multiple predictor variables over the future time period. In some embodiments, the processing circuit is configured to generate a model that estimates the production or consumption in terms of the predictor variables based on the cumulative production or consumption of the resource and the aggregated values for each of the multiple predictor variables. In some embodiments, the processing circuit is configured to input, to the model, the values of the multiple predictor variables sampled at each of the multiple times within the future time period to estimate a production or consumption of the resource at each of the multiple times within the future time period such that the predicted cumulative production or consumption of the resource for the future time period is disaggregated into estimated productions or consumptions of the resource within the future time period. In some embodiments, the processing circuit is configured to operate equipment using the estimated productions or consumptions of the resource at each of the multiple times.

In some embodiments, the processing circuit is further configured to determine a number of the multiple times that occur within the future time period, and sum each of the values of the multiple predictor variables sampled during the number of the multiple times to aggregate the multiple predictor variable values.

In some embodiments, the processing circuit is further configured to select the predictor variables based on an effect of each of the predictor variables on the productions or consumptions of the resource.

In some embodiments, the processing circuit is further configured to generate a regression model based on the predicted cumulative productions or consumptions of the resource identified.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
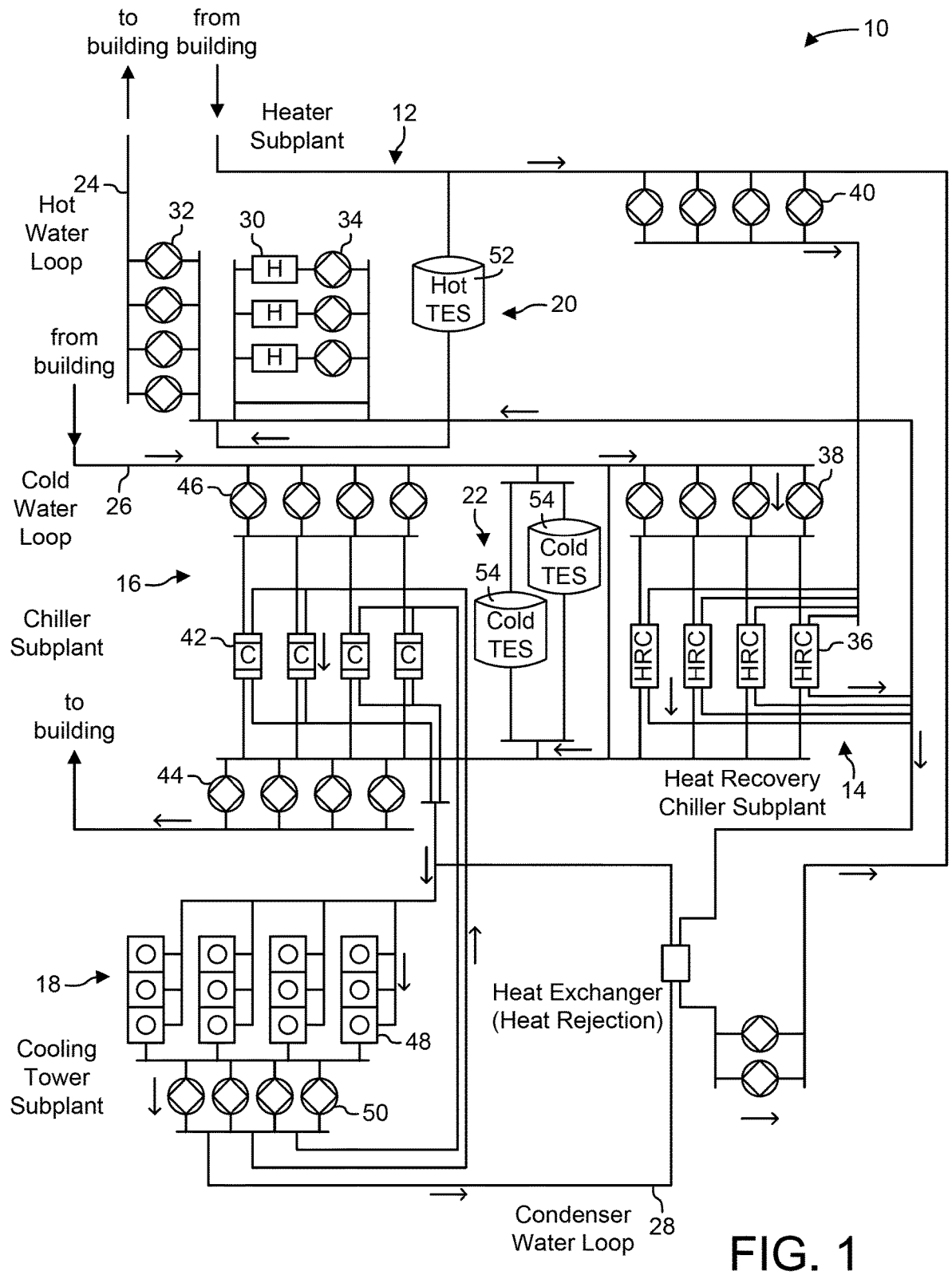
FIG. 1 is a schematic diagram of a central plant having a plurality of subplants including a heater subplant, heat recovery chiller subplant, a chiller subplant, a hot thermal energy storage subplant, and a cold thermal energy storage subplant, according to an exemplary embodiment.

Referring generally to the FIGURES, systems and methods for estimating hourly heating and cooling loads of a building to facilitate operation of a central plant are shown, according to an exemplary embodiment. A central plant may include may include various types of equipment configured to serve the thermal energy loads of a building or campus (i.e., a system of buildings). For example, a central plant may include heaters, chillers, heat recovery chillers, cooling towers, or other types of equipment configured to provide heating or cooling for the building or campus. The central plant equipment may be divided into various groups configured to perform a particular function. Such groups of central plant equipment are referred to herein as subplants. For example, a central plant may include a heater subplant, a chiller subplant, a heat recovery chiller subplant, a cold thermal energy storage subplant, a hot thermal energy storage subplant, etc. The subplants may consume resources from one or more utilities (e.g., water, electricity, natural gas, etc.) to serve the energy loads of the building or campus. Optimizing the central plant may include operating the various subplants in such a way that results in a minimum monetary cost to serve the building energy loads.

The present disclosure focuses on systems and methods for transforming central energy facility supplied building energy loads into building energy loads at a higher sampling resolution (e.g., data sampled more often). For example, monthly and daily heating and cooling loads may be transformed into hourly heating and cooling loads which can be used as inputs to a central plant optimization tool (e.g., a planning tool, a dispatch scheduler, etc.). The central plant may use estimated or predicted loads as an input to control plant operation, and may not be able control plant operation without the estimated or predicted loads. The accurate transformation of supplied building energy load data to a higher resolution provides the data needed by the optimization tool to optimize the performance of the central plant (e.g., minimize spikes in energy consumption, optimize thermal energy storage, optimize a dispatch schedule for the central plant, etc.). The optimization tool may be used to optimize the performance of the central plant. In some embodiments, the optimization tool may plan a dispatch schedule for the central plant or otherwise operate as an optimization tool.

The systems and methods described herein train a predictive model using monthly or daily load values. Predictor variables may be sampled at hourly intervals and aggregated to generate cumulative monthly or daily values for the predictor variables. The predictive model may be trained using the monthly or daily load values as the dependent variable and the aggregated predictor variable values as the independent variables. In some embodiments, the predictive model is a regression model such as a multiple linear regression (MLR) model or a nonlinear model having a plurality of regression coefficients. Training the predictive model may include generating values for regression coefficients. Once the predictive model is trained (e.g., the values for the regression coefficients are determined) the hourly predictor variable values may be used as an input to the predictive model to generate hourly predictions for the load. For example, hourly values of the predictor variables such as an hourly boiler electrical efficiency may be used to estimate hourly values for the heating and/or cooling loads.

In addition to estimating building loads, it is contemplated that the systems and methods described herein may be used to disaggregate various other types of aggregated data. Disaggregation of monthly natural gas consumption from, for example, monthly values to daily values has applications to forecasting natural gas utility demand. The new estimation method follows a process of creating a regression between physical predictor variables and supplied data points, and using the calculated relationship on data sampled at a higher resolution. This process generates estimated values for the load data (or any other dependent variable) at a higher sampling rate than normally available. Additional features and advantages of the current invention are described in greater detail below.

Central Plant

Referring now to FIG. 1, a diagram of a central plant 10 is shown, according to an exemplary embodiment. Central plant 10 is shown to include a plurality of subplants including a heater subplant 12, a heat recovery chiller subplant 14, a chiller subplant 16, a cooling tower subplant 18, a hot thermal energy storage (TES) subplant 20, and a cold thermal energy storage (TES) subplant 22. Subplants 12-22 consume resources (e.g., water, natural gas, electricity, etc.) from utilities to serve the thermal energy loads (e.g., hot water, cold water, heating, cooling, etc.) of a building or campus. For example, heater subplant 12 may be configured to heat water in a hot water loop 24 that circulates the hot water between central plant 10 and a building (not shown). Chiller subplant 16 may be configured to chill water in a cold water loop 26 that circulates the cold water between central plant 10 and the building. Heat recovery chiller subplant 14 may be configured to transfer heat from cold water loop 26 to hot water loop 24 to provide additional heating for the hot water and additional cooling for the cold water. Condenser water loop 28 may absorb heat from the cold water in chiller subplant 16 and reject the absorbed heat in cooling tower subplant 18 or transfer the absorbed heat to hot water loop 24. Hot TES subplant 20 and cold TES subplant 22 store hot and cold thermal energy, respectively, for subsequent use.

Hot water loop 24 and cold water loop 26 may deliver the heated and/or chilled water to air handlers located on the rooftop of a building or to individual floors or zones of the building. The air handlers push air past heat exchangers (e.g., heating coils or cooling coils) through which the water flows to provide heating or cooling for the air. The heated or cooled air may be delivered to individual zones of the building to serve the thermal energy loads of the building. The water then returns to central plant 10 to receive further heating or cooling in subsystems 12-22.

Although central plant 10 is shown and described as heating and cooling water for circulation to a building, it is understood that any other type of working fluid (e.g., glycol, $CO_2$, etc.) may be used in place of or in addition to water to serve the thermal energy loads. In other embodiments, central plant 10 may provide heating and/or cooling directly to the building or campus without requiring an intermediate heat transfer fluid. Central plant 10 may be physically separate from a building served by subplants 12-22 or physically integrated with the building (e.g., located within the building).

Each of subplants 12-22 may include a variety of equipment configured to facilitate the functions of the subplant. For example, heater subplant 12 is shown to include a plurality of heating elements 30 (e.g., boilers, electric heaters, etc.) configured to add heat to the hot water in hot water loop 24. Heater subplant 12 is also shown to include several pumps 32 and 34 configured to circulate the hot water in hot water loop 24 and to control the flow rate of the hot water through individual heating elements 30. Heat recovery chiller subplant 14 is shown to include a plurality of heat recovery heat exchangers 36 (e.g., refrigeration circuits) configured to transfer heat from cold water loop 26 to hot water loop 24. Heat recovery chiller subplant 14 is also shown to include several pumps 38 and 40 configured to circulate the hot water and/or cold water through heat recovery heat exchangers 36 and to control the flow rate of the water through individual heat recovery heat exchangers 36.

Chiller subplant 16 is shown to include a plurality of chillers 42 configured to remove heat from the cold water in cold water loop 26. Chiller subplant 16 is also shown to include several pumps 44 and 46 configured to circulate the cold water in cold water loop 26 and to control the flow rate of the cold water through individual chillers 42. Cooling tower subplant 18 is shown to include a plurality of cooling towers 48 configured to remove heat from the condenser water in condenser water loop 28. Cooling tower subplant 18 is also shown to include several pumps 50 configured to circulate the condenser water in condenser water loop 28 and to control the flow rate of the condenser water through individual cooling towers 48.

Hot TES subplant 20 is shown to include a hot TES tank 52 configured to store the hot water for later use. Hot TES subplant 20 may also include one or more pumps or valves configured to control the flow rate of the hot water into or out of hot TES tank 52. Cold TES subplant 22 is shown to include cold TES tanks 54 configured to store the cold water for later use. Cold TES subplant 22 may also include one or more pumps or valves configured to control the flow rate of the cold water into or out of cold TES tanks 54. In some embodiments, one or more of the pumps in central plant 10 (e.g., pumps 32, 34, 38, 40, 44, 46, and/or 50) or pipelines in central plant 10 includes an isolation valve associated therewith. In various embodiments, isolation valves may be integrated with the pumps or positioned upstream or downstream of the pumps to control the fluid flows in central plant 10. In other embodiments, more, fewer, or different types of devices may be included in central plant 10.

Load Estimation

Figure 2:
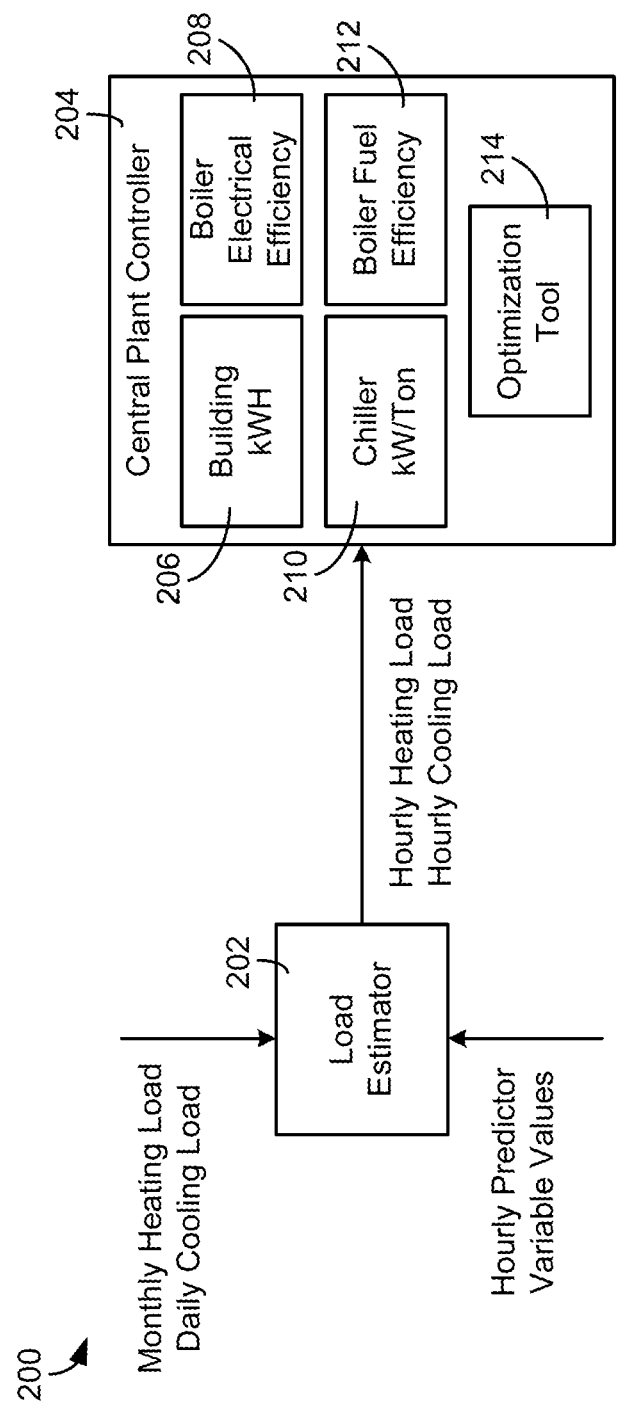
FIG. 2 is a block diagram illustrating the flow of information between a load estimator and a central plant controller that may be used to control the central plant of FIG. 1, according to an exemplary embodiment.

Referring now to FIG. 2, a block diagram of a system 200 illustrating the flow of information between a load estimator 202 and a central plant controller 204 that may be used to control the central plant of FIG. 1 is shown, according to an exemplary embodiment. Central plant controller 204 is shown to include an optimization tool 214 for controlling a central plant. Central plant controller 204 and/or optimization tool 214 may receive hourly heating and cooling loads as inputs. Without these inputs, optimization tool 214 may not run. Load estimator 202 may receive inputs of cumulative building energy loads over a first time period (e.g., monthly heating loads and daily cooling loads). Load estimator 202 may increase the resolution of the cumulative building energy loads to generate load values for each of a plurality of second time periods shorter than the first time period. For example, load estimator 202 may transform the monthly heating loads and daily cooling loads into hourly heating and cooling loads and may provide the hourly load values to central plant controller 204 and/or optimization tool 214. Central plant controller 204 may control operations of central plant 10 using the hourly heating and cooling loads. The time period over which each of the loads may be sampled is not limited to those shown or specifically enumerated, and may be any amount of time.

Load estimator 202 is shown to receive inputs of monthly heating and daily cooling loads, according to an exemplary embodiment. The time period over which each of the loads may be sampled is not limited to those shown or specifically enumerated, and may be any amount of time. For example, the time period may be a month for cooling loads and a day for heating loads. In some embodiments, the time periods are measured in minutes or seconds. In some embodiments, load estimator 202 receives only heating loads or only cooling loads. In other embodiments load estimator 202 receives both heating and cooling loads. In some embodiments, the building energy loads are sampled by load estimator 202 directly from plant equipment. In other embodiments, the building energy loads are input to load estimator 202 from utility providers or an outside source, such as a third-party utility management system.

Load estimator 202 may receive inputs of hourly predictor variable values, according to an exemplary embodiment. Predictor variables may be directly correlated to the load on central plant 10. Properly selected predictor variables are important to accurately estimate building energy loads. Although hourly values for the predictor variables are shown in FIG. 2, it should be understood that the time period over or interval at which each of the predictor variables is sampled is not limited to those shown or specifically enumerated, and may be any length of time. For example, the sampling interval could be five minutes, three hours, or any other duration. The resolution at which each of the predictor variables is sampled may be the same as the resolution of the load values estimated by load estimator 202. For example, if load estimator 202 estimates hourly building energy loads, load estimator 202 may receive hourly predictor variable values.

Using the sampled predictor variable values, load estimator 202 may generate a model that estimates the building energy load in terms of (i.e., as a function of) the predictor variables. After the model is trained, load estimator 202 may use the model to estimate building energy loads over a plurality of time periods. For example, load estimator 202 may estimate hourly cooling loads over a day. The estimated building energy loads may be estimated for time periods within the time period of the received building energy load. For example, load estimator 202 may receive a monthly heating load. Load estimator 202 may estimate hourly heating loads over the same month for which the monthly heating load was received. The input load data may include a plurality of data points. In some embodiments, the number of input load data points is preferably equal to, or greater than, the number of predictor variables.

Referring still to FIG. 2, the estimated building energy loads may be transmitted to central plant controller 204. Central plant controller 204 may use the estimated building energy loads to make control decisions for central plant 10. Central plant controller 204 may control a distribution of energy loads in central plant 10 based on the estimated building energy loads. Central plant controller 204 is shown to include input data building kWh 206, boiler electrical efficiency 208, chiller kW/ton 210, and boiler fuel efficiency 212. In various embodiments, inputs 206-212 may be received from other systems or devices (e.g., controllers, building equipment, user devices, etc.) or stored in memory within central plant controller 204. Central plant controller 204 may be communicatively coupled to central plant subsystems 12-22. In other embodiments, inputs 206-212 may be received from a third-party utility management system. Inputs 206-212 may be simulated or estimated values.

Building kWh 206 may be the electricity consumption of the building served by the central plant (i.e., the building that requires heating or cooling). The building kWh is the electric demand of the building, which may be satisfied by receiving electricity from an electric utility. The building also has a demand for heating or cooling, which is satisfied by receiving heating or cooling from central plant 10. Central plant controller 204 may use the building's electricity consumption as an input to estimate an amount of internal heat generation within the building, which may increase the amount of cooling required or decrease the amount of heating required. An increase in a building's electricity consumption may also increase the total electric consumption of the system (e.g., the building and the central plant) which may be considered by central plant controller 204 when optimizing the performance of central plant 10. For example, if the building has a high electricity consumption at a particular time, central plant controller 204 may attempt to minimize the electricity usage of central plant 10 at that time in order to avoid a spike in electricity consumption for the overall system. Utilities may impose a "demand charge," which is proportional to the maximum power consumption at any time within a given time period. One solution for avoiding high demand charges is to reduce spikes in electricity consumption.

Boiler electrical efficiency 208 may be the electrical power efficiency for all boilers in central plant 10. Boiler electrical efficiency 208 may be sampled for each hour, day, month, year, etc. Boiler fuel efficiency 212 may be the fuel efficiency for all boilers in central plant 10. In some embodiments, the boilers in central plant 10 use a mixture of electricity and fuel to run. Some boilers in central plant 10 may run entirely on electricity while other boilers run entirely on fuel. In some embodiments, boilers in central plant 10 may consist of any mixture of purely electrically powered, purely fuel-driven, and a mixture of electrically powered and fuel-driven boilers. In some embodiments, all boilers in central plant 10 have the same efficiency applied to all hours in a month. Chiller kW/ton 210 may be the efficiency of chillers of central plant 10. In some embodiments, chiller kW/ton 210 is sampled for each hour, day, month, year, etc. In some embodiments, all chillers in central plant 10 have the same efficiency across all hours in a year.

Central plant controller 204 may use inputs 206-212 and the estimated heating and cooling loads to control a distribution of energy loads in central plant 10. The systems and methods of operation of load estimator 202 and central plant controller 204 are described in greater detail in the discussion of FIGS. 3-10.

Figure 3:
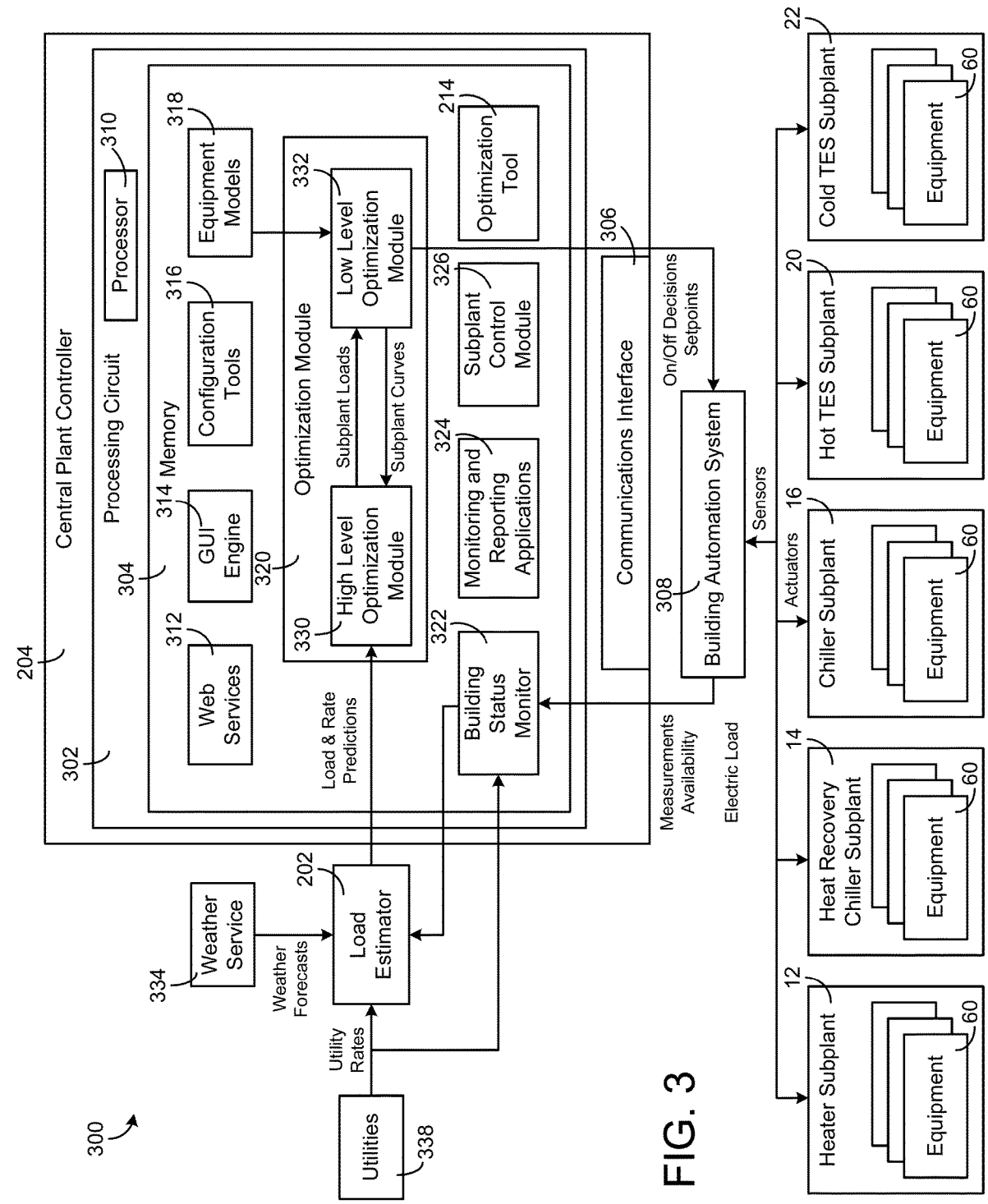
FIG. 3 is a block diagram illustrating a central plant system including the load estimator and the central plant controller of FIG. 2 in greater detail, according to an exemplary embodiment.

Referring now to FIG. 3, a block diagram illustrating a central plant system 300 is shown, according to an exemplary embodiment. System 300 is shown to include central plant controller 204, a building automation system 308, and a plurality of subplants 12-22. Subplants 12-22 may be the same as previously described with reference to FIG. 1. For example, subplants 12-22 are shown to include a heater subplant 12, a heat recovery chiller subplant 14, a chiller subplant 16, a hot TES subplant 20, and a cold TES subplant 22.

Each of subplants 12-22 is shown to include equipment 60 that can be controlled by central plant controller 204 and/or building automation system 308 to optimize the performance of central plant 10. Equipment 60 may include, for example, heating devices 30, chillers 42, heat recovery heat exchangers 36, cooling towers 48, thermal energy storage devices 52, 54, pumps 32, 44, 50, valves 34, 38, 46, and/or other devices of subplants 12-22. Individual devices of equipment 60 can be turned on or off to adjust the thermal energy load served by each of subplants 12-22. In some embodiments, individual devices of equipment 60 can be operated at variable capacities (e.g., operating a chiller at 10% capacity or 60% capacity) according to an operating setpoint received from central plant controller 204.

In some embodiments, one or more of subplants 12-22 includes a subplant level controller configured to control the equipment 60 of the corresponding subplant. For example, central plant controller 204 may determine an on/off configuration and global operating setpoints for equipment 60. In response to the on/off configuration and received global operating setpoints, the subplant controllers may turn individual devices of equipment 60 on or off, and implement specific operating setpoints (e.g., damper position, vane position, fan speed, pump speed, etc.) to reach or maintain the global operating setpoints.

Still referring to FIG. 3, system 300 is shown to include load estimator 202. Load estimator 202 may be configured to predict the thermal energy loads ($\hat{l}_k$) of the building or campus for each time step k (e.g., k=1 . . . n) of an optimization period. Load estimator 202 is shown receiving weather forecasts from a weather service 334. In some embodiments, load estimator 202 predicts the thermal energy loads $\hat{l}_k$ as a function of the weather forecasts. In some embodiments, load estimator 202 uses feedback from BAS 308 to predict loads $\hat{l}_k$. Feedback from BAS 308 may include various types of sensory inputs (e.g., temperature, flow, humidity, enthalpy, etc.) or other data relating to the controlled building (e.g., inputs from a HVAC system, a lighting control system, a security system, a water system, etc.). The operation of load estimator 202 is described in greater detail in FIGS. 4-10.

Building automation system (BAS) 308 may be configured to monitor conditions within a controlled building or building zone. For example, BAS 308 may receive input from various sensors (e.g., temperature sensors, humidity sensors, airflow sensors, voltage sensors, etc.) distributed throughout the building and may report building conditions to central plant controller 204. Building conditions may include, for example, a temperature of the building or a zone of the building, a power consumption (e.g., electric load) of the building, a state of one or more actuators configured to affect a controlled state within the building, or other types of information relating to the controlled building. BAS 308 may operate subplants 12-22 to affect the monitored conditions within the building and to serve the thermal energy loads of the building.

BAS 308 may receive control signals from central plant controller 204 specifying on/off states and/or setpoints for equipment 60. BAS 308 may control equipment 60 (e.g., via actuators, power relays, etc.) in accordance with the control signals provided by central plant controller 204. For example, BAS 308 may operate equipment 60 using closed loop control to achieve the setpoints specified by central plant controller 204. In various embodiments, BAS 308 may be combined with central plant controller 204 or may be part of a separate building management system. According to an exemplary embodiment, BAS 308 is a METASYS® brand building management system, as sold by Johnson Controls, Inc.

Central plant controller 204 may monitor the status of the controlled building using information received from BAS 308. In some embodiments, load estimator 202 is a component of central plant controller 204. For example, central plant controller 204 may be configured to predict the thermal energy loads (e.g., heating loads, cooling loads, etc.) of the building for plurality of time steps in a prediction window (e.g., using weather forecasts from a weather service). Central plant controller 204 may generate on/off decisions and/or setpoints for equipment 60 to minimize the cost of energy consumed by subplants 12-22 to serve the predicted heating and/or cooling loads for the duration of the prediction window. Central plant controller 204 and load estimator 202 may be configured to carry out process 500 (FIG. 5) and other processes described herein. According to an exemplary embodiment, central plant controller 204 is integrated within a single computer (e.g., one server, one housing, etc.). In various other exemplary embodiments, central plant controller 204 can be distributed across multiple servers or computers (e.g., that can exist in distributed locations). In another exemplary embodiment, central plant controller 204 may integrated with a smart building manager that manages multiple building systems and/or combined with BAS 308.

Central plant controller 204 is shown to include a communications interface 306 and a processing circuit 302. Communications interface 306 may include wired or wireless interfaces (e.g., jacks, antennas, transmitters, receivers, transceivers, wire terminals, etc.) for conducting data communications with various systems, devices, or networks. For example, communications interface 306 may include an Ethernet card and port for sending and receiving data via an Ethernet-based communications network and/or a WiFi transceiver for communicating via a wireless communications network. Communications interface 306 may be configured to communicate via local area networks or wide area networks (e.g., the Internet, a building WAN, etc.) and may use a variety of communications protocols (e.g., BACnet, IP, LON, etc.).

Communications interface 306 may be a network interface configured to facilitate electronic data communications between central plant controller 204 and various external systems or devices (e.g., BAS 308, subplants 12-22, etc.). For example, central plant controller 204 may receive information from BAS 308 indicating one or more measured states of the controlled building (e.g., temperature, humidity, electric loads, etc.) and one or more states of subplants 12-22 (e.g., equipment status, power consumption, equipment availability, etc.). Communications interface 306 may receive inputs from BAS 308 and/or subplants 12-22 and may provide operating parameters (e.g., on/off decisions, setpoints, etc.) to subplants 12-22 via BAS 308. The operating parameters may cause subplants 12-22 to activate, deactivate, or adjust a setpoint for various devices of equipment 60.

Still referring to FIG. 3, processing circuit 302 is shown to include a processor 310 and memory 304. Processor 310 may be a general purpose or specific purpose processor, an application specific integrated circuit (ASIC), one or more field programmable gate arrays (FPGAs), a group of processing components, or other suitable processing components. Processor 310 may be configured to execute computer code or instructions stored in memory 304 or received from other computer readable media (e.g., CDROM, network storage, a remote server, etc.).

Memory 304 may include one or more devices (e.g., memory units, memory devices, storage devices, etc.) for storing data and/or computer code for completing and/or facilitating the various processes described in the present disclosure. Memory 304 may include random access memory (RAM), read-only memory (ROM), hard drive storage, temporary storage, non-volatile memory, flash memory, optical memory, or any other suitable memory for storing software objects and/or computer instructions. Memory 304 may include database components, object code components, script components, or any other type of information structure for supporting the various activities and information structures described in the present disclosure. Memory 304 may be communicably connected to processor 310 via processing circuit 302 and may include computer code for executing (e.g., by processor 310) one or more processes described herein.

Still referring to FIG. 3, memory 304 is shown to include a building status monitor 322. Central plant controller 204 may receive data regarding the overall building or building space to be heated or cooled with central plant 10 via building status monitor 322. In an exemplary embodiment, building status monitor 322 may include a graphical user interface component configured to provide graphical user interfaces to a user for selecting building requirements (e.g., overall temperature parameters, selecting schedules for the building, selecting different temperature levels for different building zones, etc.).

Central plant controller 204 may determine on/off configurations and operating setpoints to satisfy the building requirements received from building status monitor 322. In some embodiments, building status monitor 322 receives, collects, stores, and/or transmits cooling load requirements, building temperature setpoints, occupancy data, weather data, energy data, schedule data, and other building parameters. In some embodiments, building status monitor 322 stores data regarding energy costs, such as pricing information available from utilities 338 (energy charge, demand charge, etc.).

Still referring to FIG. 3, memory 304 is shown to include an optimization module 320. Optimization module 320 may perform a cascaded optimization process to optimize the performance of central plant 10. For example, optimization module 320 is shown to include a high level optimization module 330 and a low level optimization module 332. High level optimization module 330 may control an outer (e.g., subplant level) loop of the cascaded optimization. High level optimization module 330 may determine an optimal distribution of thermal energy loads across subplants 12-22 for each time step in the prediction window in order to optimize (e.g., minimize) the cost of energy consumed by subplants 12-22. Low level optimization module 332 may control an inner (e.g., equipment level) loop of the cascaded optimization. Low level optimization module 332 may determine how to best run each subplant at the load setpoint determined by high level optimization module 330. For example, low level optimization module 332 may determine on/off states and/or operating setpoints for various devices of equipment 60 in order to optimize (e.g., minimize) the energy consumption of each subplant while meeting the thermal energy load setpoint for the subplant. The cascaded optimization process is described in greater detail with reference to FIG. 3.

Still referring to FIG. 3, memory 304 is shown to include a subplant control module 326. Subplant control module 326 may store historical data regarding past operating statuses, past operating setpoints, and instructions for calculating and/or implementing control parameters for subplants 12-22. Subplant control module 326 may also receive, store, and/or transmit data regarding the conditions of individual devices of equipment 60, such as operating efficiency, equipment degradation, a date since last service, a lifespan parameter, a condition grade, or other device-specific data. Subplant control module 326 may receive data from subplants 12-22 and/or BAS 308 via communications interface 306. Subplant control module 326 may also receive and store on/off statuses and operating setpoints from low level optimization module 332.

Data and processing results from optimization module 320, subplant control module 326, or other modules of central plant controller 204 may be accessed by (or pushed to) monitoring and reporting applications 324. Monitoring and reporting applications 324 may be configured to generate real time "system health" dashboards that can be viewed and navigated by a user (e.g., a central plant engineer). For example, monitoring and reporting applications 324 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across central plants in different buildings (real or modeled), different campuses, or the like. Other GUI elements or reports may be generated and shown based on available data that allow users to assess performance across one or more central plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the central plant.

Referring still to FIG. 3, memory 304 is shown to include a optimization tool 214. Optimization tool 214 may utilize load estimator 202 and optimization module 320 to simulate the operation of a central plant over a predetermined time period (e.g., a day, a month, a week, a year, etc.) for planning, budgeting, and/or design considerations. When implemented with optimization tool 214, optimization module 320 may use building loads estimated by load estimator 202 and utility rates to determine an optimal subplant load distribution to minimize cost over a simulation period. This mode of operation may be referred to as online or live operation. In other embodiments, optimization tool 214 operates in an offline or planning mode in which optimization tool 214 may not be responsible for real-time control of a building automation system or central plant. In some embodiments, optimization module 320 and optimization tool 214 are combined into a single integrated tool that performs both online and offline optimization. Accordingly, any of the components or functionality of optimization module 320 described herein may also be components or functionality of optimization tool 214, and vice versa.

High level optimization module 330 may receive planned loads estimated by load estimator 202 and utility rates from utilities 338 for the entire simulation period. In some embodiments, the planned loads and utility rates may be defined by input received from a user via a client device (e.g., user-defined, user selected, etc.) or retrieved from a database. High level optimization module 330 uses the planned loads and utility rates in conjunction with subplant curves from low level optimization module 332 to determine optimal subplant loads (i.e., an optimal dispatch schedule) for a portion of the simulation period.

The portion of the simulation period over which high level optimization module 330 optimizes the subplant loads may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimization module 330 requests all of the subplant curves used in the simulation from low level optimization module 332 at the beginning of the simulation. Since the planned loads and environmental conditions are known for the entire simulation period, high level optimization module 330 may retrieve all of the relevant subplant curves at the beginning of the simulation. In some embodiments, low level optimization module 332 generates functions that map subplant production to equipment level production and resource use when the subplant curves are provided to high level optimization module 330. These subplant to equipment functions may be used to calculate the individual equipment production and resource use (e.g., in a post-processing module) based on the results of the simulation.

Still referring to FIG. 3, optimization tool 214 may allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. In some embodiments, optimization tool 214 may present user interfaces for building the simulation. The user interfaces may allow users to define simulation parameters graphically. In some embodiments, the user interfaces allow a user to select a pre-stored or pre-constructed simulated plant and/or plan information and adapt it or enable it for use in the simulation. In some embodiments, optimization tool 214 may plan and control operations of central plant 10. Optimization tool 214 may receive estimated building energy loads from load estimator 202.

Still referring to FIG. 3, central plant controller 204 may include one or more GUI servers, web services 312, or GUI engines 314 to support monitoring and reporting applications 324. Central plant controller 204 may also include equipment models 318 which output to low level optimization module 332. In various embodiments, applications 324, web services 312, and GUI engine 314 may be provided as separate components outside of central plant controller 204 (e.g., as part of a smart building manager). Central plant controller 204 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 204 may be configured to provide the results of any such processing to other databases, tables, XML files, or other data structures for further querying, calculation, or access by, for example, external monitoring and reporting applications.

Central plant controller 204 is shown to include configuration tools 316. Configuration tools 316 can allow a user to define (e.g., via graphical user interfaces, via prompt-driven "wizards," etc.) how central plant controller 204 should react to changing conditions in the central plant subsystems. In an exemplary embodiment, configuration tools 316 allow a user to build and store condition-response scenarios that can cross multiple central plant devices, multiple building systems, and multiple enterprise control applications (e.g., work order management system applications, entity resource planning applications, etc.). For example, configuration tools 316 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 316 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Still referring to FIG. 3, low level optimization module 332 may generate and provide subplant curves to high level optimization module 330. Subplant curves may indicate the rate of utility use by each of subplants 12-22 (e.g., electricity use measured in kW, water use measured in L/s, etc.) as a function of the subplant load. In some embodiments, low level optimization module 332 generates subplant curves based on equipment models 318 (e.g., by combining equipment models 318 for individual devices into an aggregate curve for the subplant). Low level optimization module 332 may generate subplant curves by running the low level optimization process for several different loads and weather conditions to generate multiple data points. Low level optimization module 332 may fit a curve to the data points to generate subplant curves. In other embodiments, low level optimization module 332 provides the data points to high level optimization module 330 and high level optimization module 330 generates the subplant curves using the data points.

High level optimization module 330 may receive the load and rate predictions from load estimator 202 and the subplant curves from low level optimization module 332. The load predictions may be based on weather forecasts from weather service 334 and/or information from building automation system 308 (e.g., a current electric load of the building, measurements from the building, a history of previous loads, a setpoint trajectory, etc.). The utility rate predictions may be based on utility rates received from utilities 338 and/or utility prices from another data source. High level optimization module 330 may determine the optimal load distribution for subplants 12-22 (e.g., a subplant load for each subplant) for each time step the prediction window and provide the subplant loads as setpoints to low level optimization module 332. In some embodiments, high level optimization module 330 determines the subplant loads by minimizing the total operating cost of central plant 10 over the prediction window. In other words, given a predicted load and utility rate information from load estimator 202, high level optimization module 330 may distribute the predicted load across subplants 12-22 over the optimization period to minimize operating cost.

In some instances, the optimal load distribution may include using TES subplants 20 and/or 22 to store thermal energy during a first time step for use during a later time step. Thermal energy storage may advantageously allow thermal energy to be produced and stored during a first time period when energy prices are relatively low and subsequently retrieved and used during a second time period when energy proves are relatively high. The high level optimization may be different from the low level optimization in that the high level optimization has a longer time constant due to the thermal energy storage provided by TES subplants 20-22. The high level optimization may be described by the following equation:

$$\theta_{HL}^* = \underset{\theta_{HL}}{\operatorname{argmin}} J_{HL}(\theta_{HL})$$

where $\theta_{HL}^*$ contains the optimal high level decisions (e.g., the optimal load for each of subplants 12-22) for the entire optimization period and $J_{HL}$ is the high level cost function.

To find the optimal high level decisions $\theta_{HL}^{*/}$, high level optimization module 330 may minimize the high level cost function $J_{HL}$. The high level cost function $J_{HL}$ may be the sum of the economic costs of each utility consumed by each of subplants 12-22 for the duration of the optimization period. In some embodiments, the high level cost function $J_{HL}$ may be described using the following equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right]$$

where $n_h$ is the number of time steps k in the optimization period, $n_s$ is the number of subplants, $t_s$ is the duration of a time step, $c_{jk}$ is the economic cost of utility j at a time step k of the optimization period, and $u_{jik}$ is the rate of use of utility j by subplant i at time step k.

In some embodiments, the cost function $J_{HL}$ includes an additional demand charge term such as:

$$w_d c_{demand} \underset{n_h}{\max}(u_{elec}(\theta_{HL}), u_{max,ele})$$

where $w_d$ is a weighting term, $c_{demand}$ is the demand cost, and the max( ) term selects the peak electricity use during the applicable demand charge period. Accordingly, the high level cost function $J_{HL}$ may be described by the equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right] + w_d c_{demand} \underset{n_h}{\max}(u_{elec}(\theta_{HL}), u_{max,ele})$$

The decision vector $\theta_{HL}$ may be subject to several constraints. For example, the constraints may restrict the subplants operating over their total capacity, that the thermal storage not charge or discharge too quickly or under/over flow for the tank, and that the thermal energy loads for the building or campus are met.

Still referring to FIG. 3, low level optimization module 332 may use the subplant loads determined by high level optimization module 330 to determine optimal low level decisions $\theta_{LL}^*$ (e.g. binary on/off decisions, flow setpoints, temperature setpoints, etc.) for equipment 60. The low level optimization process may be performed for each of subplants 12-22. Low level optimization module 332 may be responsible for determining which devices of each subplant to use and/or the operating setpoints for such devices that will achieve the subplant load setpoint while minimizing energy consumption. The low level optimization may be described using the following equation:

$$\theta_{LL}^* = \underset{\theta_{LL}}{\operatorname{argmin}} J_{LL}(\theta_{LL})$$

where $\theta_{LL}^s$ contains the optimal low level decisions and $J_{LL}$ is the low level cost function.

To find the optimal low level decisions $\theta_{LL}^*$, low level optimization module 332 may minimize the low level cost function $J_{LL}$. The low level cost function $J_{LL}$ may represent the total energy consumption for all of equipment 60 in the applicable subplant. The low level cost function $J_{LL}$ may be described using the following equation:

$$J_{LL}(\theta_{LL}) = \sum_{j=1}^{N} t_s \cdot b_j \cdot u_j(\theta_{LL})$$

where N is the number of devices of equipment 60 in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

Low level optimization module 332 may minimize the low level cost function $J_{LL}$ subject to inequality constraints based on the capacities of equipment 60 and equality constraints based on energy and mass balances. In some embodiments, the optimal low level decisions $\theta_{LL}^*$ are constrained by switching constraints defining a short horizon for maintaining a device in an on or off state after a binary on/off switch. The switching constraints may prevent devices from being rapidly cycled on and off. In some embodiments, low level optimization module 332 performs the equipment level optimization without considering system dynamics. The optimization process may be slow enough to safely assume that the equipment control has reached its steady-state. Thus, low level optimization module 332 may determine the optimal low level decisions $\theta_{LL}^*$ at an instance of time rather than over a long horizon.

Low level optimization module 332 may determine optimum operating statuses (e.g., on or off) for a plurality of devices of equipment 60. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear). Low level optimization module 332 may also determine optimum operating setpoints for equipment using nonlinear optimization. Nonlinear optimization may identify operating setpoints that further minimize the low level cost function $J_{LL}$. Low level optimization module 332 may provide the on/off decisions and setpoints to building automation system 308 for use in controlling the central plant equipment 60.

Load estimator 202 may receive utility rates from utilities 338. Utility rates may indicate a cost or price per unit of a resource (e.g., electricity, natural gas, water, etc.) provided by utilities 338 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 338 or predicted utility rates estimated by load estimator 202.

In some embodiments, the utility rates include demand charges for one or more resources provided by utilities 338. A demand charge may define a separate cost imposed by utilities 338 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, optimization module 320 may be configured to account for demand charges in the high level optimization process performed by high level optimization module 330. Utilities 338 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period.

Load Estimator

Figure 4:
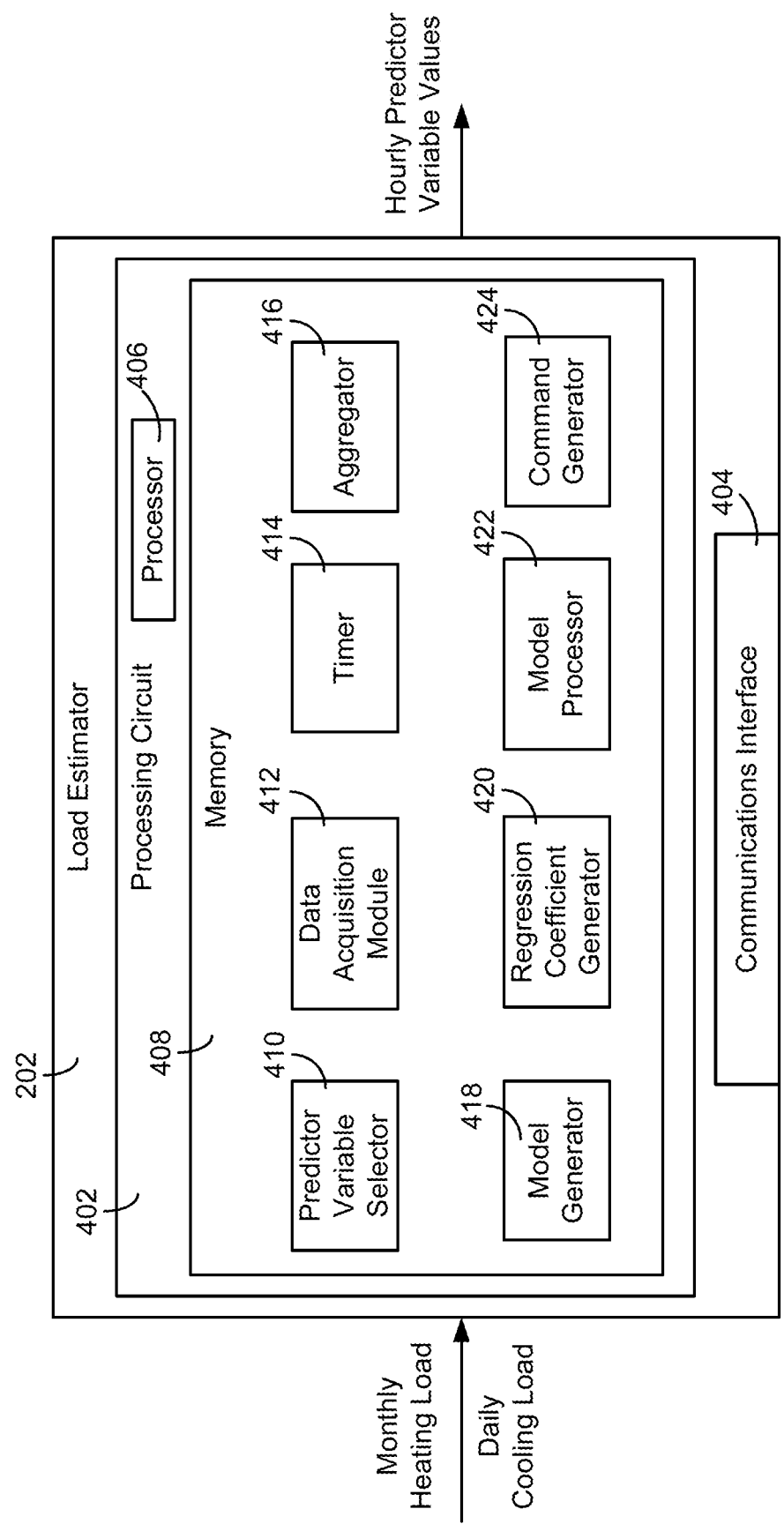
FIG. 4 is a block diagram illustrating the load estimator of FIG. 3 in greater detail, according to an exemplary embodiment.

Referring now to FIG. 4, a block diagram illustrating load estimator 202 in greater detail is shown, according to an exemplary embodiment. Load estimator 202 may receive one or more cumulative building energy loads (e.g., heating or cooling loads) for a first time period. For example, load estimator 202 is shown receiving a monthly heating load and a daily cooling load. The time period over which each of the loads may be sampled is not limited to those shown or specifically enumerated, and may be any amount of time. Load estimator 202 may be configured to increase the resolution of the building energy loads and provide higher-resolution building energy loads to central plant controller 204. For example, load estimator 202 may transform the monthly heating load into hourly heating load values for each hour in the first time period (e.g., each hour in the month for which the cumulative heating load is received). Similarly, load estimator 202 may transform the daily cooling load into hourly cooling load values for each hour in the first time period (e.g., each hour in the day for which the cumulative cooling load is received). Load estimator 202 may provide the hourly heating and cooling load values to central plant controller 204 for use in optimizing central plant operation and/or as inputs to an optimization tool.

Load estimator 202 is shown to include a processing circuit 402 and a communications interface 404. Communications interface 404 may include wired or wireless interfaces (e.g., jacks, antennas, transmitters, receivers, transceivers, wire terminals, etc.) for conducting data communications with various systems, devices, or networks. For example, communications interface 404 may include an Ethernet card and port for sending and receiving data via an Ethernet-based communications network and/or a WiFi transceiver for communicating via a wireless communications network. Communications interface 404 may be configured to communicate via local area networks or wide area networks (e.g., the Internet, a building WAN, etc.) and may use a variety of communications protocols (e.g., BACnet, IP, LON, etc.).

Communications interface 404 may be a network interface configured to facilitate electronic data communications between load estimator 202 and various external systems or devices (e.g., central plant controller 204, BAS 308, subplants 12-22, etc.). For example, load estimator 202 may receive information from central plant controller 204 indicating one or more measured states of the controlled building (e.g., temperature, humidity, electric loads, etc.) and one or more states of subplants 12-22 (e.g., equipment status, power consumption, equipment availability, etc.). Communications interface 306 may receive inputs from BAS 308 and/or subplants 12-22 and may provide operating parameters (e.g., on/off decisions, setpoints, etc.) to subplants 12-22 via BAS 308. The operating parameters may cause subplants 12-22 to activate, deactivate, or adjust a setpoint for various devices of equipment 60.

Processing circuit 402 is shown to include a processor 406 and memory 408. Processor 406 may be a general purpose or specific purpose processor, an application specific integrated circuit (ASIC), one or more field programmable gate arrays (FPGAs), a group of processing components, or other suitable processing components. Processor 406 may be configured to execute computer code or instructions stored in memory 408 or received from other computer readable media (e.g., CDROM, network storage, a remote server, etc.).

Memory 408 may include one or more devices (e.g., memory units, memory devices, storage devices, etc.) for storing data and/or computer code for completing and/or facilitating the various processes described in the present disclosure. Memory 408 may include random access memory (RAM), read-only memory (ROM), hard drive storage, temporary storage, non-volatile memory, flash memory, optical memory, or any other suitable memory for storing software objects and/or computer instructions. Memory 408 may include database components, object code components, script components, or any other type of information structure for supporting the various activities and information structures described in the present disclosure. Memory 408 may be communicably connected to processor 406 via processing circuit 402 and may include computer code for executing (e.g., by processor 406) one or more processes described herein. Modules of memory 408 may be implemented separately as software (e.g., code to be executed by processor 406), hardware (e.g., circuitry), or any combination of software and hardware.

Still referring to FIG. 4, memory 408 is shown to include a predictor variable selector 410. Predictor variable selector 410 may select a set of predictor variables for use in a building energy load model. The building energy load model may be used to predict the building energy loads provided to central plant controller 204 as a function of the predictor variables. Predictor variable selector 410 may select predictor variables which affect (e.g., are correlated with) the cumulative building energy load received by load estimator 202. Predictor variables may be important to accurately estimate hourly data, as each variable affects the building energy load. Categories of predictor variables may include base load terms, weather-affected terms, and periodic terms.

Predictor variable selector 410 may select weather-affected terms. Terms correlated with weather data may include the cooling degree day, heating degree day, absolute humidity, and wet bulb depression. The thermal load of a building may be strongly correlated to the weather. A degree day is a measure of the temperature relative to a reference temperature. When the temperature is above the reference temperature, it is called a cooling degree day (CDD). When the temperature is below the reference temperature, it is called a heating degree day (HDD). Several properties of air may affect building energy load, such as the outside air temperature, or dry bulb temperature ($T_{db}$), and relative humidity (RH). Relative humidity is a percentage of maximum moisture content, which varies based on $T_{db}$, pressure, and altitude. As aggregation of data including RH may be difficult, an absolute humidity can be calculated and used as a predictor variable. Another property of air that can be calculated is the wet bulb temperature ($T_{wb}$). Independently, $T_{wb}$ does not definitively indicate whether heating or cooling is necessary. However, the wet bulb depression, which is the difference between $T_{db}$ and $T_{wb}$, may represent a meaningful correlation with building energy load.

Predictor variable selector 410 may select periodic terms to include in the model generated by load estimator 202. Building energy loads may follow repeating trends based on different time periods, such as the day of the week, the month, etc. For example, building energy loads are typically higher during weekdays than during weekends due to increased equipment usage and increased occupancy during the weekdays. The harmonic effects of the day of the week terms can be modeled using a Fourier series, and the first harmonic is the most significant to the prediction process.

Still referring to FIG. 4, memory 408 is shown to include data acquisition module 412. Data acquisition module 412 may acquire values for each of the variables used by load estimator 202. For example, data acquisition module 412 may acquire cumulative building energy load values for a first time period (e.g., a monthly heating load, a daily cooling load, etc.). Data acquisition module 412 may acquire values for each of the predictor variables at a plurality of times within the first time period (e.g., hourly values for each of the predictor variables).

Data acquisition module 412 may sample data from BAS 308 and/or subplants 12-22. Data acquisition module 412 may directly communicate with subplants 12-22 through communications interface 404. In some embodiments, data acquisition module 412 communicates with subplants 12-22 through BAS 308. Data acquisition module 412 may communicate with weather service 334 and/or utilities 338. In some embodiments, data acquisition module 412 simply receives data transmitted from weather service 334 and/or utilities 338. In other embodiments, data acquisition module 412 requests data from sources at times which may be determined by load estimator 202. For example, data acquisition module 412 may request data from subplants 12-22 at times input by a user through communications interface 404.

Data acquisition module 412 may sample the selected predictor variables at a plurality of times. The sampling times may be determined by timer 414. For example, the predictor variables may be sampled at hourly intervals. In some embodiments, data acquisition module 412 requests values of the predictor variables. The predictor variables may be calculated prior to being received by load estimator 202. In other embodiments, data acquisition module 412 may request values of variables which are used in the calculation of the predictor variables. Data acquisition module 412 may calculate the values of the predictor variables based on the sampled values of the variables that affect the value of the predictor variables.

Data acquisition module 412 may request data from sources at times determined by timer 414. In some embodiments, data acquisition module 412 requests data from central plant controller 204. For example, data acquisition module 412 can request building data from BAS 308 to process feedback. In some embodiments, load estimator 202 receives feedback from central plant controller 204 and alters generated models based on the feedback received. Data acquisition module 412 may request values of predictor variables selected by a user. In some embodiments, a user may input predictor variables through communications interface 404. Data acquisition module 412 may determine the relevant equipment to communicate with. In some embodiments, data acquisition module 412 may calculate the predictor variable values using other collected data.

Memory 408 is shown to include timer 414. Timer 414 may determine times at which load estimator 202 requests data. In some embodiments, timer 414 may determine times at which load estimator 202 transmits data. Timer 414 may communicate with components of load estimator 202, such as data acquisition module 412 and aggregator 416. Timer 414 may be implemented as clock. In some embodiments, timer 414 may determine times at which to sample or request data based on user input through communications 404. For example, a user may input a command to timer 414 to produce sampling times each hour. Timer 414 may transmit the sampling times as control signals to data acquisition module 412 to acquire data at the specified times. In some embodiments, timer 414 may transmit control signals to sample data at the times at which data is to be sampled. Timer 414 may determine the time periods over which estimated building energy loads are to be calculated. For example, timer 414 may transmit a set of time periods to modules of load estimator 202 over which to calculate the building energy loads. Timer 414 may determine the time periods over which predictor variables are to be aggregated. The times at which the predictor variables are to be sampled may be the same for each predictor variable. In some embodiments, timer 414 may calculate different times at which each predictor variable is sampled.

Still referring to FIG. 4, memory 408 is shown to include an aggregator 416. Aggregator 416 may generate aggregated values for the predictor variables. Aggregator 416 may receive a time period over which the predictor variable values are to be aggregated. For example, timer 414 may command aggregator 416 to aggregate predictor variables over the period of a day or month. In some embodiments, aggregator 416 aggregates the predictor variables by summing multiple predictor variable values for the specified time period. For example, aggregator 416 may sum a set of hourly predictor variable values to generate an aggregated predictor variable value for a day or month. In other embodiments, aggregator 416 aggregates data by averaging, performing regressions, integrating, etc.

Aggregator 416 may determine how to aggregate values based on the input data received by load estimator 202. In some embodiments, aggregator 416 generates aggregated values for each of the predictor variables over a time period that matches the cumulative load values received as an input to load estimator 202. For example, aggregator 416 may sum predictor variable values over a day if daily cooling load data is received. Aggregator 416 may sum predictor variable values over a month if monthly heating load data is received. The aggregated predictor variable values may be used in conjunction with the cumulative load values to generate regression coefficients for the building energy load model.

Memory 408 is shown to include model generator 418. Model generator 418 may generate a model which estimates building energy loads as a function of the selected predictor variables. In some embodiments, a piecewise multiple linear regression is used to accurately capture monthly trends instead of applying a single regression to an entire year. For example, daily cooling load data may be received by load estimator 202. A piecewise multiple linear regression may be used to capture monthly trends of the model generated to predict the cooling loads. For example, a cooling load model generated by model generator 418 may have the form:

$$Y=\beta_0+\beta_1 \cdot +\beta_2 \cdot CDD65+\beta_3 \cdot CDD75+\beta_4 \cdot HDD55+\\ \beta_5 \cdot HDD65+\beta_6 \cdot \Delta CDD+ \ldots \beta_8 \cdot H+\beta_9 \cdot (T_{db}-T_{wb})+\\ \beta_{10} \cdot DoW_{c,1}+\beta_{11} \cdot DoW_{s,1}$$

where Y is the cumulative load value (e.g., the daily cooling load) and each of $\beta_x$ (where x is a positive integer) is a regression coefficient which represents the effect each predictor variable has on the predicted cooling load. In this embodiment, G is a term which accounts for growth of a building load over time. The associated coefficient $\beta_1$ may be positive, indicating an increasing building load over time. CDDXX (e.g., CDD65, CDD75) may represent a XX° F. cooling degree day (CDD), which represents the degrees above the reference temperature of XX° F. for a specific temperature value. Similarly, HDDXX (e.g., HDD55, HDD65) may represent a XX° F. heating degree day (HDD), which represents the degrees below the reference temperature of XX° F. for a specific temperature value. $\Delta CDD$ or $\Delta HDD$ may represent a delta degree day of either cooling or heating, which is the difference between the CDD predictor variable or the HDD predictor variable at the current time and at the time one measurement prior. H may represent the absolute humidity of a building. The term $(T_{db}-T_{wb})$ may represent a wet bulb depression, which is the difference between a dry bulb temperature (outside air temperature) and a wet bulb temperature (the temperature a parcel of air would have if it were cooled to saturation (e.g., 100% relative humidity) by the evaporation of water into it). Building cooling loads may follow repeating trends based on different time periods, such as the day of the week. The term $DoW_{x,n}$ may represent harmonic effects of day of week terms on building loads.

In another example, a heating load model generated by model generator 418 may have the form:

$$Y=\beta_0+\beta_1 \cdot CDD65+\beta_2 \cdot HDD55+\beta_3 \cdot HDD65+\beta_4 \cdot H+\beta_5 \cdot\\ (T_{db}-T_{wb})+\beta_6 \cdot DoW_{c,1}+\beta_7 \cdot DoW_{s,1}$$

where Y is the cumulative load value (e.g., the monthly heating load) and each of $\beta_x$ (where x is a positive integer) is a regression coefficient which represents the effect each variable has on the predicted cooling load. HDDXX may represent a XX° F. heating degree day (HDD), which represents the degrees below the reference temperature of XX° F. a specific temperature is. The term $(T_{db}-T_{wb})$ may represent a wet bulb depression, which is the difference between a dry bulb temperature and a wet bulb temperature as previously described. Building heating loads may also follow repeating trends based on different time periods, such as the day of the week. The term $DoW_{x,n}$ may represent harmonic effects of day of week terms on building loads.

Model generator 418 may generate a separate model for each building energy load. In some embodiments, model generator 418 may determine how many models to generate based on the type of input received by load estimator 202. For example, if load estimator 202 receives only cooling load data, load estimator 202 may generate one model (e.g., a cooling load model). If load estimator 202 receives daily cooling load data and monthly cooling data, load estimator 202 may generated one model based on the daily cooling load data and one model based on the monthly cooling data. If load estimator 202 receives daily cooling load data and daily heating load data, load estimator 202 may generate one model based on the cooling load data and one model based on the heating load data. Load estimator 202 may generate one model based on both the cooling data and the heating load data. Load estimator 202 may determine how many models to generate and which sets of data to use automatically. In some embodiments, load estimator 202 may receive input from a user through communications interface 404.

Memory 408 is shown to include regression coefficient generator 420. Regression coefficient generator 420 may be configured to generate values for each of the regression coefficients (i.e., the β values) in the building energy load models. In some embodiments, a regression process is used to generate values for plurality of regression coefficients in the model generated by model generator 418. The regression process may use the cumulative building energy load received by load estimator 202 and the aggregated values for each of the predictor values generated by aggregator 416. The regression process may be a multiple linear regression process. In some embodiments, the regression process is an autoregressive process. The regression process may be any statistical process for determining coefficients of a model. An exemplary embodiment of the regression process of regression coefficient generator 420 is discussed below. The following discussion is meant to be illustrative only, and is not restrictive.

In an illustrative implementation, regression coefficient generator 420 determines the coefficients related to the 5 different predictor variables. In some embodiments, the coefficients are determined at the resolution that the supplied data is sampled. The resolution at which the supplied data (Y) is sampled is the time period over which the supplied data (e.g., cooling load, heating load, etc.) is collected. For example, if daily cooling loads are provided, the coefficients for the cooling model may be determined at a daily resolution. In this exemplary embodiment, all predictor variables (X) are sampled at an hourly resolution and are aggregated to the resolution of the supplied data. For the cooling model, the resolution of the supplied data in this exemplary embodiment is daily. The supplied heating load data may be provided at a monthly resolution, and the predictor variables (X) for the heating model are aggregated to a monthly resolution.

The regression equation for this exemplary embodiment is:

$$Y = X \cdot \beta$$

where Y, X, and $\beta$ are matrices. In some embodiments, Y, X, and/or $\beta$ are column or row matrices (i.e., vectors) representing the supplied building energy load data, the predictor variables, and the regression coefficients, respectively. Each entry of the vectors represents a value of the supplied data or the sampled value of a predictor variable for each time at which the predictor variables are sampled. Using the ordinary least squares (OLS) method, the following equation used for the cooling load model can be solved for $\beta$:

$$\hat{\beta} = (X_{Daily}^T X_{Daily})^{-1} X_{Daily}^T Y_{Daily}$$

OLS is a method for estimating unknown variables in a linear regression model. The method minimizes the squared differences between the supplied data the responses predicted by the linear approximation of the data. Visually, the method may be illustrated as the sum of the squared vertical distances between each data point in the supplied data and the corresponding point on the regression line—the smaller the squared differences, the better the model fits the data.

The OLS method may be used for the cooling load model since the supplied data is daily, and each day has the same number of hours. However, as the heating model may be fit on monthly data, the different number of hours per month creates non-constant variance in the regression model. The time period over which each of the loads may be sampled is not limited to those shown or specifically enumerated, and may be any amount of time. To correct for the non-constant variance due to the supplied monthly heating load data, the weighted least squares (WLS) method may be used. The coefficients for WLS are solved for by defining a weight matrix $$W = \begin{bmatrix} w_1 & \cdots & 0 \\ \vdots & \ddots & \vdots \\ 0 & \cdots & w_n \end{bmatrix}$$

where $w_i = \sqrt{DM}$, and DM is the number of days in month i. Using WLS, the following equation can be solved:

$$\hat{\beta} = (WX_{Monthly})^T(WX_{Monthly}))^{-1}(WX_{Monthly}^T)Y_{Monthly}$$

Cooling Regression

In this exemplary embodiment, the cooling loads are provided to load estimator 202 in daily increments. Solving the linear regression equation using OLS for the cooling load model regression coefficients yields:

$$Y = \beta_0 + \beta_1 \cdot G + \beta_2 \cdot CDD65 + \beta_3 \cdot CDD75 + \beta_4 \cdot HDD55 + \beta_5 \cdot HDD65 + \beta_6 \cdot \Delta CDD + \ldots \beta_8 \cdot H + \beta_9 \cdot (T_{db} - T_{wb}) + \beta_{10} \cdot DoW_{c,1} + \beta_{11} \cdot DoW_{s,1}$$

A constrained piecewise OLS regression may be performed for the cooling load model using data sets for each month of the year. The constraint may be imposed to ensure that all predicted loads are positive. Constraints may be chosen to bound regression coefficients so the coefficients cannot take non-physical values. For example, CDD65 (cooling degree day, 65° F.) may be known to have a positive impact on cooling load, so a constraint may be placed on the sign of the regression coefficient such that the coefficient is always positive. Hence, we bound its value to be from 0 to $\infty$. The piecewise function for allows the model to simulate different seasons with different regression coefficients and predictor variables, depending on relevant data. Three sets of months are identified in this exemplary embodiment: summer, shoulder, and winter months. For example, the base load, heating degree day (HDD), humidity adjustments, and harmonic terms are used to calculate the cooling load for the winter months (December through February).

Training data for summer months may include data collected starting in July and ending in June of the next year. In this exemplary embodiment, the summer months were identified as May through September. The summer months were determined based on the number of CDD during the months. The monthly division may be specific to each application of the load estimator 202. The monthly division may be determined by a user through communications interface 404. For example, a user may input June through August as the summer months. In this exemplary embodiment, the training data contained minimal HDDs from May through September, and the HDD predictor variables were removed. In some embodiments, the accuracy of the summer months is the most important aspect of the model, since the summer months determine the peak electrical demand for the entire year. The overall regression equation for the summer months of this illustrative implementation is:

$$Y = \beta_0 + \beta_1 \cdot G + \beta_2 \cdot CDD65 + \beta_3 \cdot CDD75 + \beta_4 \cdot \Delta CDD + \beta_5 \cdot \Delta HDD + \beta_6 \cdot H + \ldots \beta_7 \cdot (T_{db} - T_{wb}) + \beta_8 \cdot DoW_{c,1} + \beta_9 \cdot DoW_{s,z}$$

Training data for shoulder months may include data collected from October, November, March, and April. In this exemplary embodiment, the sampled predictor variable values showed that these months had a mix of HDDs and CDDs, making them shoulder months. In addition, thermal loads at these temperature ranges may be heavily influenced by the amount of moisture in the air, so the absolute humidity and wet bulb depression terms may have a significant influence on the accuracy of the prediction. Constraints on the regression coefficients used for the summer months may be applied to the regression of the shoulder months to ensure estimated building energy loads are positive. The overall regression equation for the shoulder months of this illustrative implementation is:

$$Y = \beta_0 + \beta_1 \cdot G + \beta_2 \cdot CDD65 + \beta_3 \cdot CDD75 + \beta_5 \cdot HDD65 + \beta_6 \Delta CDD + \beta_7 \cdot H + \ldots \beta_8 \cdot (T_{db} - T_{wb}) + \beta_9 \cdot DoW_{c,1} + \beta_{10} \cdot DoW_{s,1}$$

Training data for winter months may include data collected beginning in December and ending in February. In this exemplary embodiment, the sampled predictor variable values indicated that these months had significantly more HDDs than CDDs, so the CDD terms were removed from the regression. To account for the removal of the CDD terms, the absolute humidity and wet bulb depression may be used. Constraints similar to the constraints imposed on the regression coefficients for the summer months may be applied to the regression coefficients for the winter months. The constraints may bound the HDD terms to have a negative effect on the cooling load. The overall regression equation for the winter months of this illustrative implementation is:

$$Y=\beta_0+\beta_1 \cdot G+\beta_2 \cdot HDD55+\beta_3 \cdot HDD65+\beta_4 \cdot H+\beta_5 \cdot (T_{db}-T_{wb})+\beta_6 \cdot DoW_{c,1}+ \ldots \beta_7 \cdot DoW_{s,1}.$$

Heating Regression

In this exemplary embodiment, the supplied heating loads were provided in a monthly resolution, which is too large for many of the identified predictor variables to be used in modeling the heating load. The growth term, periodic terms, and delta degree day terms of this illustrative implementation are time based, and may produce inappropriate behavior when applied to the heating load regression. Additionally, a piecewise regression may not be possible, due to the small number of data points supplied. In this exemplary embodiment, twelve data points were supplied—one for each month from July to June of the next year. A simplified multiple linear regression may be developed for the heating load model, which includes one regression equation for the entire year:

$$Y=\beta_0+\beta_1 \cdot CDD65+\beta_2 \cdot HDD55+\beta_3 \cdot HDD65+\beta_4 \cdot H+\beta_5 \cdot (T_{db}-T_{wb}).$$

As heating plants may run primarily on natural gas, there is no demand charge associated with the heating load. As a result, it may be more important for the summation of the entire year to be identical between the supplied data and the regressed data than it is to match peaks for each day. In this exemplary embodiment, an inequality constraint may be applied to the coefficient values, such that $X \cdot \beta \leq Y$.

A second constraint may be applied such that the estimated hourly load cannot exceed plant capacity of central plant 10, such that:

$$X_{Hourly} \cdot \beta \leq Q_{capacity}$$

where $Q_{capacity}$ is the heating load capacity of the plant.

A third constraint on the heating load model may be on the regression coefficients. The constraints may bound the coefficients to signs that model the physical dynamics of the system. For example, constraints may limit the signs of CDDs to have a negative correlation with heating load.

Referring still to FIG. 4, memory 408 is shown to include model processor 422. Model processor 422 may apply the model generated by model generator 418 to estimate a building energy load. The model applied by model processor 422 may estimate a building energy load by simulating the desired sampling rate for the building energy load. In a continuation of the exemplary embodiment discussed with respect to regression coefficient generator 420, the equation used to model an hourly building energy load may be:

$$Y_{Hourly}=X_{Hourly} \cdot \beta$$

In this embodiment, model processor 422 may input the hourly sampled predictor variable values and the calculated regression coefficients to determine the hourly building energy load. The operation of model processor 422 may be based on a relationship between the predictor variables and the loads which are similar regardless of sampling rate.

In some embodiments, model processor 422 verifies results of the model by aggregating the estimated points to the supplied data resolution. The supplied data resolution may be hourly, daily, monthly, etc. Once the data is aggregated, a statistical analysis can be performed to find the coefficient of variation of the root mean square error. A coefficient of variation of the root mean square error of less than or equal to 10% may signify that the regression results are statistically close to the supplied data.

Referring still to FIG. 4, memory 408 is shown to include command generator 424. Command generator 424 may generate commands for central plant 10 based on the building energy loads estimated by load estimator 202. In some embodiments, load estimator 202 communicates the commands directly to subplants 12-22 through communications interface 404. In other embodiments, load estimator 202 communicates the commands to central plant controller 204 and/or BAS 308. Command generator 424 may generate control signals which directly control equipment of central plant 10. In other embodiments, the control signals generated by command generator 424 may indicate a high level command which is processed by high level optimization module 330. In some embodiments, command generator 424 is an embodiment of optimization tool 214. Command generator 424 may control a distribution of energy loads in central plant 10 based on the building energy loads estimated by load estimator 202.

Optimizing Central Plant Operation and Estimating Building Energy Loads

Figure 5:
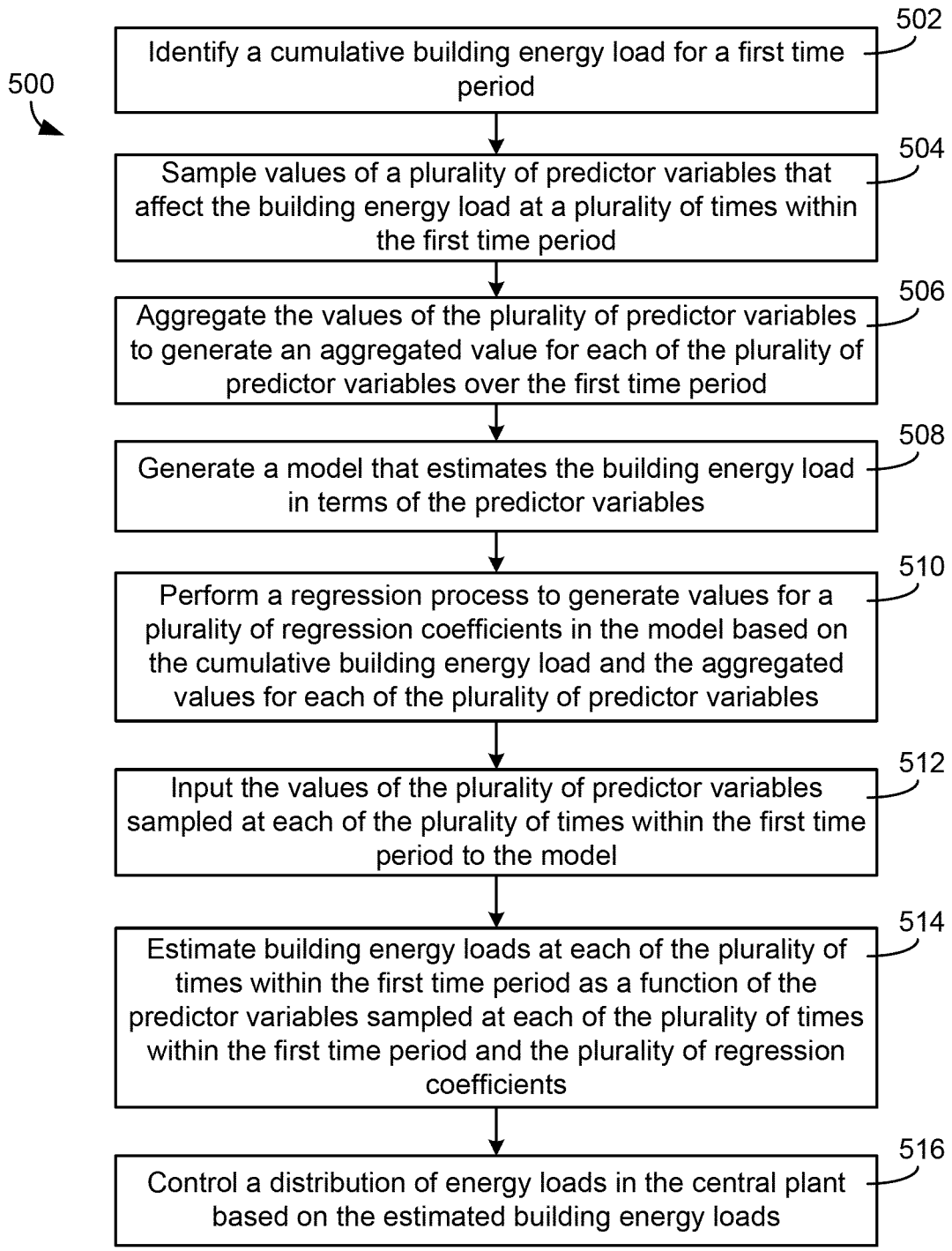
FIG. 5 is a flowchart of a process for controlling a distribution of energy loads in the central plant of FIG. 1 based on building energy loads estimated by the load estimator of FIG. 2, according to an exemplary embodiment.

Referring now to FIG. 5, a flowchart of process 500 for optimizing operation of central plant 10 of FIG. 1 is shown, according to an exemplary embodiment. Process 500 may be performed by one or more components of system 200 (e.g., load estimator 202, central plant controller 204, etc.) as described with reference to FIG. 2.

Process 500 begins with step 502, in which system 200 identifies a cumulative building energy load for a first time period. The first time period may be a day, a month, etc. The cumulative building energy load may be the cooling load, heating load, etc. For example, system 200 may identify a daily cooling load. In some embodiments, system 200 may identify more than one cumulative building energy load. The time periods may not be the same for each cumulative building energy load. For example, system 200 may identify a daily cooling load and a monthly heating load. The time periods are not restricted to those specifically enumerated. The building energy loads are not restricted to the time periods specifically enumerated. For example, system 200 may identify a weekly cooling load and an hourly heating load. In some embodiments, step 502 is performed by load estimator 202. In other embodiments, step 502 is performed by central plant controller 204

Process 500 continues with step 504, in which system 200 samples values of a plurality of predictor variables that affect the building energy load at a plurality of times within the first time period. For example, if the first time period is daily, the predictor variables may be sampled hourly (e.g., at each hour within the day). The plurality of times within the first time period may be determined by load estimator 202 and/or timer 414. In some embodiments, step 504 is performed by load estimator 202 and/or data acquisition module 412. In other embodiments, step 504 is performed by central plant controller 204. The plurality of predictor variables may be selected by load estimator 202 and/or predictor variable selector 410. The sampled values of the plurality of predictor variables may be stored in memory 304 or memory 408. In some embodiments, values of variables used to calculate the selected predictor variables are sampled. System 200 may then calculate the values of the predictor variables based on the sampled values. An exemplary process for selecting predictor variables is discussed in greater detail in the description of FIG. 6.

Still referring to FIG. 5, process 500 continues with step 506, in which load estimator 202 aggregates the values of the plurality of predictor variables to generate an aggregated value for each of the plurality of predictor variables over the first time period. For example, if the predictor variables are sampled hourly and the first time period is daily, load estimator 202 may aggregate the values of the predictor variables to generate an aggregated value for each of the predictor values over a day. In some embodiments, load estimator 202 may aggregate predictor variable values by determining the number of times within the first time period at which the predictor variables are sampled, and summing the values sampled at those times. For example, load estimator 202 may sum 24 hourly samples of a predictor variable to generate an aggregate daily value for the predictor variable. Step 504 may be performed by load estimator 202 and/or aggregator 416.

Process 500 continues with step 508, in which load estimator 202 generates a model that estimates the building energy load in terms of the predictor variables. Step 508 may be performed by load estimator 202 and/or model generator 418. Load estimator 202 may generate a regression model for each of the building energy loads received. For example, if load estimator 202 receives a cooling load and a heating load, load estimator 202 may generate one regression model for the cooling load and a separate regression model for the heating load. In some embodiments, load estimator 202 may generate a multiple linear regression model. The model generated by load estimator 202 may be any statistical or simulation model. Exemplary models which may be generated in step 508 are described in detail with reference to model generator 418.

Process 500 continues with step 510, in which load estimator 202 performs a regression process to generate values for a plurality of regression coefficients in the model based on the cumulative building energy load and the aggregated values for each of the plurality of predictor variables. For example, load estimator 202 may perform a multiple linear regression to generate values for the plurality of regression coefficients. In some embodiments, load estimator 202 generates different values for the plurality of regression coefficients based on the cumulative building energy load received. For example, load estimator 202 may generate one set of values for the plurality of regression coefficients for a daily cooling load, and a separate set of values for the plurality of regression coefficients for a monthly heating load. Step 510 may be performed by load estimator 202 and/or regression coefficient generator 420. An exemplary regression process is discussed in greater detail in the description of FIG. 4.

Process 500 continues with step 512, in which load estimator 202 inputs the values of the plurality of predictor variables sampled at each of the plurality of times within the first time period to the model generated in step 508. For example, load estimator 202 may apply the hourly values of the predictor variables to the model generated in step 508. Although the model is generated based on cumulative load values (e.g., monthly or daily load values) and aggregated values for the plurality of predictor variables, the relationships provided by the model apply regardless of the sampling rate. Therefore, the model can be used to estimate hourly load values by applying hourly values of the predictor variables as an input to the model. Load estimator 202 may read the values of the plurality of predictor values from memory 304 or memory 408. In some embodiments, the values of the plurality of predictor variables are input directly to the model once the model is generated. Step 512 may be performed by load estimator 202 and/or model processor 422.

Process 500 continues with step 514, in which load estimator 202 estimates building energy loads at each of the plurality of times within the first time period as a function of the predictor variables sampled at each of the plurality of times within the first time period and the plurality of regression coefficients. For example, if the first time period is a month, load estimator 202 may estimate an hourly cooling load for each hour of the month for which the cumulative cooling load was received. Values for the building energy loads may be calculated, as the regression coefficients and the values of the predictor variables at each of the plurality of times within the first time period are known. Load estimator 202 may estimate the building energy loads using the model generated in step 508. In some embodiments, the model is a linear equation for which the estimated building energy load may be solved. Step 514 may be performed by load estimator 202 and/or model processor 422. In some embodiments, steps 512 and 514 are performed as one step. An illustrative implementation of steps 512 and 514 is discussed in further detail in the description of FIG. 4.

Process 500 concludes with step 516, in which system 200 controls a distribution of energy loads in central plant 10 of FIG. 1 based on the estimated building energy loads. Step 516 may be performed by load estimator 202 and/or command generator 424. In some embodiments, step 516 is performed by central plant controller 204. Central plant controller 204 may receive the estimated building energy loads from load estimator 202. Central plant controller 204 may transmit control signals to central plant 10 through BAS 308. In some embodiments, load estimator 202 communicates directly with central plant 10 through communications interface 404.

The building energy loads estimated by load estimator 202 may be used to optimize the operation of central plant 10. For example, operation of central plant 10 may be altered to maximize energy consumption during low time-of-use rate periods and minimize energy consumption during high time-of-use rate periods. In some embodiments, the estimated building energy loads are stored in memory 304 or memory 408. In other embodiments, the estimated building energy loads are transmitted to central plant controller 204. The estimated building energy loads may be transmitted to optimization tool 214. Optimization tool 214 may use the estimated building energy loads to plan operations of central plant 10. In some embodiments, there is no indication that the estimated building energy loads are estimated, and optimization tool 214 may operate normally, as described in the discussion of FIG. 3.

Selecting Predictor Variables

Figure 6:
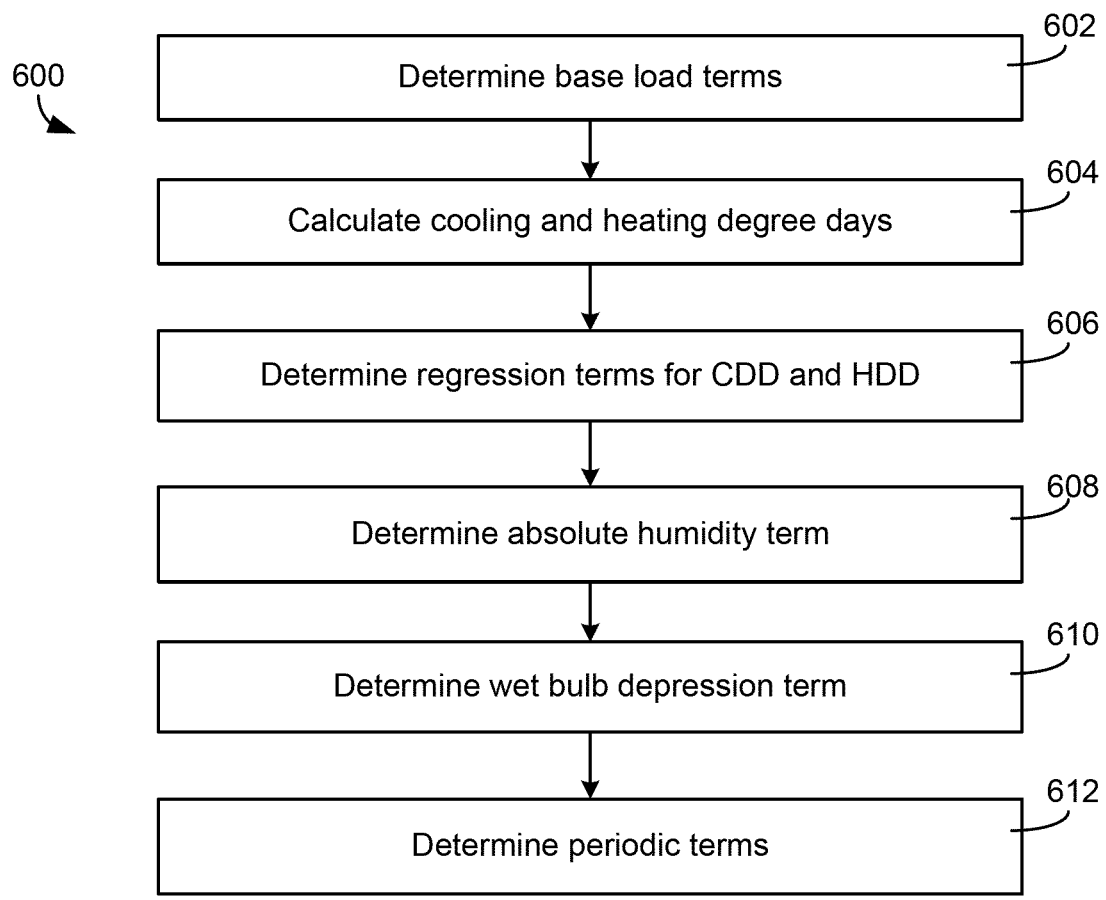
FIG. 6 is a flowchart of a process for selecting predictor variables used by the load estimator of FIG. 2, according to an exemplary embodiment.

Referring now to FIG. 6, a flowchart of process 600 for selecting predictor variables for generating a model to estimate building energy loads is shown, according to an exemplary embodiment. Process 600 may be performed by one or more components of system 200 (e.g., load estimator 202, central plant controller 204, etc.) as described with reference to FIG. 2.

Process 600 begins with step 602, in which load estimator 202 determines the base load terms. Step 602 may be performed by load estimator 202 and/or predictor variable selector 410. The base load terms may include a term representing the base load and a term representing the growth of the building energy load. The base load term may be used to describe the thermal load associated with either process heating or process cooling. For example, a college campus may utilize heating year round for local hot water usage or air conditioning in temperature sensitive areas. The base load term may be represented by an n×1 matrix (i.e., a column matrix, or column vector) with values corresponding to the number of hours in the resolution of the supplied building energy load data. n may represent the number of hours in the resolution of the supplied building energy load data, so that a base load term for a model in which the resolution of the supplied data is monthly may have an n value of the number of days in the month multiplied by 24. For example, if the supplied data is a daily cooling load, the base load term may be represented by a 24×1 column vector. If the supplied data is a monthly heating load for the month of December, which has 31 days, the base load term may be represented by a 744×1 column vector. The base load term may be represented in the regression by:

$$\beta_0 \cdot [N \times 1].$$

In some embodiments, a term which represents the growth of the building energy load over time is included in the model. Increases in base load may be attributed to increase in building population, equipment upgrades, etc. The growth term may be represented by a simple n×1 matrix. For example, the matrix may have values of [1, 2, 3 ... n]. The growth term coefficient may have a positive value if there is an increasing building energy load over time. The growth term coefficient may have a negative value if there is a decreasing building energy load over time. The growth term may be represented by:

$$\beta_1 \cdot G$$

Process 600 may continue with step 604, in which load estimator 202 calculates cooling and heating degree days. Step 604 may be performed by load estimator 202 and/or predictor variable selector 410. Terms correlated with weather data may include the cooling degree day, heating degree day, absolute humidity, and wet bulb depression. The thermal load of a building may be strongly correlated to the weather. A degree day is a measure of the temperature relative to a reference temperature. When the temperature is above the reference temperature, it is called a cooling degree day (CDD). When the temperature is below the reference temperature, it is called a heating degree day (HDD). In an exemplary embodiment, equations for calculating hourly degree days are:

$$CDD_{Hourly} = \frac{\max(T - T_{ref}, 0)}{24} \text{ and } HDD_{Hourly} = \frac{\max(T_{ref} - T, 0)}{24}$$

where $T^{ref}$ is the reference temperature or balance point of the building/facility and T is the hourly outside air temperature (dry bulb temperature).

Process 600 continues with step 606, in which load estimator 202 determines regression terms for CDD and HDD. Step 606 may be performed by load estimator 202 and/or predictor variable selector 410. The exemplary equations above generate a line with a constant slope. To reduce the difficulty of finding the exact balance point of central plant 10 in this particular embodiment, a second reference temperature is used to calculate HDD and CDD. The second reference temperature may create a kink in the line and allow the regression to pick the optimal reference point for the kink. The regression parameters for the basic degree days take the following form:

$$\beta_2 \cdot CDD65 + \beta_3 \cdot CDD75 + \beta_4 \cdot HDD55 + \beta_5 \cdot HDD65$$

Degree day values may be n×1 matrices (i.e., column matrices or column vectors), where n is the number of times for which the predictor values are sampled in the resolution of the supplied data. For example, if load estimator 202 receives a daily cooling load, n is 24. In this particular embodiment, the predictor values are sampled hourly. If a sampling rate other than hourly is being used in the regression, the HDD and CDD values are summed from the hourly data using the following equations:

$$DailyCDD_n = \sum_{i=1+24(n-1)}^{24 \cdot n} HourlyCDD_i \text{ and } MonthlyCDD_n = \sum_{i=1+M(n-1)}^{M \cdot n} DailyCDD_i$$

where M is the number of days in the month, and n is the index of the month.

The temperature trend can have an effect on how much heating or cooling is utilized. The effect can be accounted for by using a delta degree day (ΔDD) term, which is the difference between the HDD or CDD at the current time, and at the time one measurement previous. The delta degree day term introduces an autoregressive term to the regression calculated using the following equation in an exemplary embodiment:

$$\Delta DD_n = DD_n - DD_{n-1}$$

The ΔDD calculation only relies on the difference between two measurements. The calculation is done using a single reference temperature, so the resolution of the degree day data used may not matter, and the calculation can be done with hourly, or daily resolution. In this particular embodiment, monthly resolution cannot be used with the ΔDD term due to the large delta in time, which would greatly reduce the significance of the term on the final regression. In this illustrative implementation, ΔDD can be calculated using CDD or HDD, producing the following regression parameters:

$$\beta_6 \cdot \Delta CDD + \beta_7 \cdot \Delta HDD$$

Process 600 continues with step 608, in which load estimator 202 determines the absolute humidity term. Step 608 may be performed by load estimator 202 and/or predictor variable selector 410. Relative humidity has a large effect on the thermal load of a building. On days with high relative humidity and high outside air temperatures, additional cooling is necessary to remove excess moisture from the air. On cool days with a high relative humidity, both cooling and heating are necessary to remove the moisture from the air while raising the temperature of the building. Since relative humidity (RH) is a percentage of maximum moisture content, which varies based on dry bulb temperature, pressure, and altitude, aggregation of RH data would be difficult. The dry bulb temperature ($T_{db}$) and RH of the air is known and the altitude and pressure are fixed, making the absolute humidity calculation simple. Absolute humidity may be used as a predictor variable, given by the following equation:

$$\beta_8 \cdot H$$

Referring still to FIG. 6, process 600 continues with step 610, in which load estimator 202 determines the wet bulb depression term. Step 610 may be performed by load estimator 202 and/or predictor variable selector 410. The wet bulb temperature ($T_{wb}$) is another property of air that can be calculated from the $T_{db}$ and RH. Absolute humidity and $T_{wb}$ are correlated, but absolute humidity is a linear property, and $T_{wb}$ is not. Independently, $T_{wb}$ does not definitively indicate whether heating or cooling is necessary. A $T_{wb}$ of 50 degrees Fahrenheit can occur on a hot day with minimal humidity, when cooling would be necessary. A $T_{wb}$ can also occur on a cool day with high humidity, when heating is necessary.

A meaningful relationship to building load can be determined using the wet bulb depression, which is the difference between $T_{db}$ and $T_{wb}$. Higher building load is typically associated with low wet bulb depression. For example, on a hot day with low wet bulb depression, additional cooling is necessary to remove humidity from the air. On a cold day with low wet bulb depression, additional heating and cooling may be used to run a reheat cycle to remove humidity from the air. Additionally, small wet bulb depression indicates that there is a lot of humidity in the air. Cooling towers may not be as effective in situations with low wet bulb depression, because less water can evaporate over a given area. Water returning to a chiller condenser will be hotter, creating a higher lift condition in the chiller in situations with low wet bulb depression. The higher lift in the chiller may force the chiller to work harder. The extra work may draw more power and increase the electricity load. A predictor value representing the extra work may be signified by the following equation:

$$\beta_9 \cdot (T_{db} - T_{wb})$$

Process 600 may conclude with step 612, in which load estimator 202 determines the periodic terms. Step 612 may be performed by load estimator 202 and/or predictor variable selector 410. Building loads follow repeating trends based on different time periods, such as the day of the week. Loads are typically higher during weekdays than during the weekends due to more equipment being used and more people being present during weekdays. In this exemplary embodiment, the harmonic effects of the day of week terms can be modeled using a Fourier series. The first harmonic may be the most significant to the estimation process. The day of the week term Do W may be an n×1 matrix (i.e., a column matrix or column vector). DoW may have an integer value between 1 and 7, correlating to the days of the week starting with Sunday. The day of week terms may be represented, according to an exemplary embodiment, by the following equations:

$$DoW_{c,1} = \cos\frac{2 \cdot \pi \cdot D}{7} \text{ and } DoW_{s,1} = \sin\frac{2 \cdot \pi \cdot D}{7}$$

In this particular embodiment, heating data was provided at monthly resolution. The day of the week terms are therefore unable to accurately predict the hourly heating load, and take the form:

$$\beta_{10} \cdot DoW_{c,1} + \beta_{11} \cdot DoW_{c,2}$$

Results and Validation

FIGS. 7-10 show the accuracy and effectiveness of the new estimation method of FIG. 5, which estimates time series values at a particular resolution by leveraging predictor variables sampled at the resolution.

Figure 7:
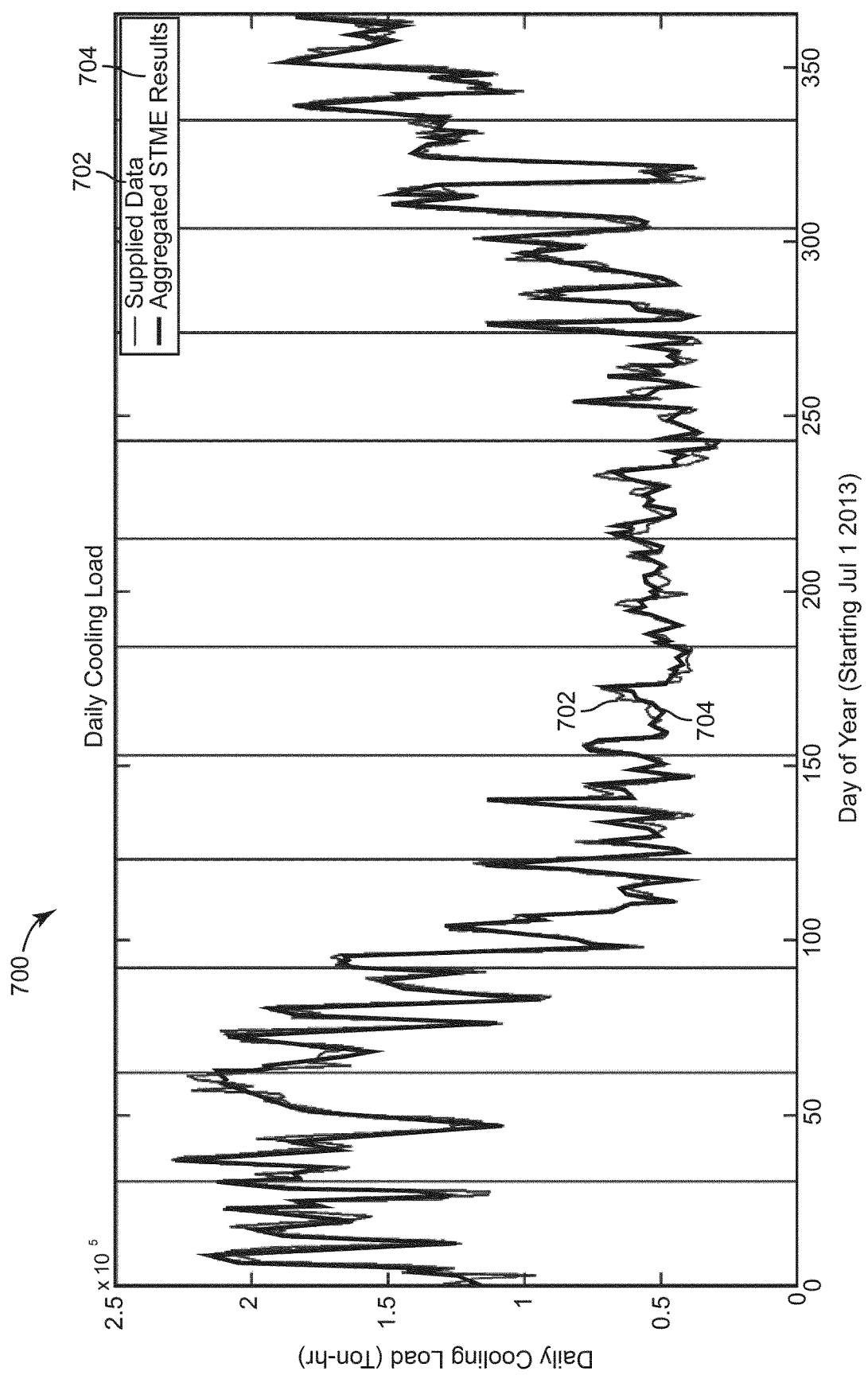
FIG. 7 is a graph of a comparison of the results of the new load estimation method of FIG. 5 with the supplied building energy load data, according to an exemplary embodiment.

Referring now to FIG. 7, a graph of a comparison 700 of the results of the new load estimation method of FIG. 5 with the supplied building energy load data is shown, according to an exemplary embodiment. Comparison 700 compares the estimation produced by load estimator 202 to supplied daily cooling load data. In this exemplary embodiment, the estimated building energy loads were hourly. Curve 702 is the supplied daily cooling load. Curve 704 represents the aggregated estimated building energy loads. Comparison 700 is shown for the period of time beginning with Jul. 1, 2013 and ending on Jun. 30, 2014. The estimated building energy loads were aggregated to facilitate comparison with the supplied data. The new load estimation method may be verified by comparing the estimated building energy loads with the supplied building energy loads.

Since a piecewise multiple linear regression was used in this particular embodiment of the new estimation method for cooling loads, a statistical analysis can be done for each month, as well as the entire year. Each section of the graph may illustrate a different regression. The supplied daily values in curve 702 were plotted with the aggregated daily values in curve 704 to give a visual representation of the ability of the new estimation method to track cooling load trends. The new estimation method is shown to accurately track the cooling loads in the summers and shoulder seasons. To statistically calculate the accuracy of the new estimation method, the coefficient of variation of the root mean square error (CVRMSE) may be calculated using the following equation:

$$CVRMSE = \frac{\sqrt{\frac{\sum_{i=1}^{n}(\hat{Y}_i - Y_i)^2}{n}}}{\overline{Y}}$$

where $\overline{Y}$ is the mean of the load.

The main fuel consumed when running a chiller plant is electricity, which has a demand charge associated with it. The demand charge may reach 80% of the peak demand for the year on large lighting and power rate schedules. Typically, the peak demand occurs when there is a high cooling load which may utilize all equipment. Such peaks happen in the summer, and specifically in August in this exemplary embodiment. The August peak may make achieving a lower CVRMSE for August, and the summer as a whole, significantly more important than having a lower CVRMSE value in the winter, when there is minimal cooling load. The overall CVRMSE for the year may be calculated as well, to determine the overall accuracy of the new estimation method.

Another consideration for the effectiveness of the new estimation method is the total cold water load predicted for the year, compared to the total cold water actually produced in that year. Ideally, the actual and predicted total cold water loads are identical, but in this particular embodiment, the equality constraint was not placed on the regression. In some embodiments, enforcing the equality constraint adds more error.

Figure 8:
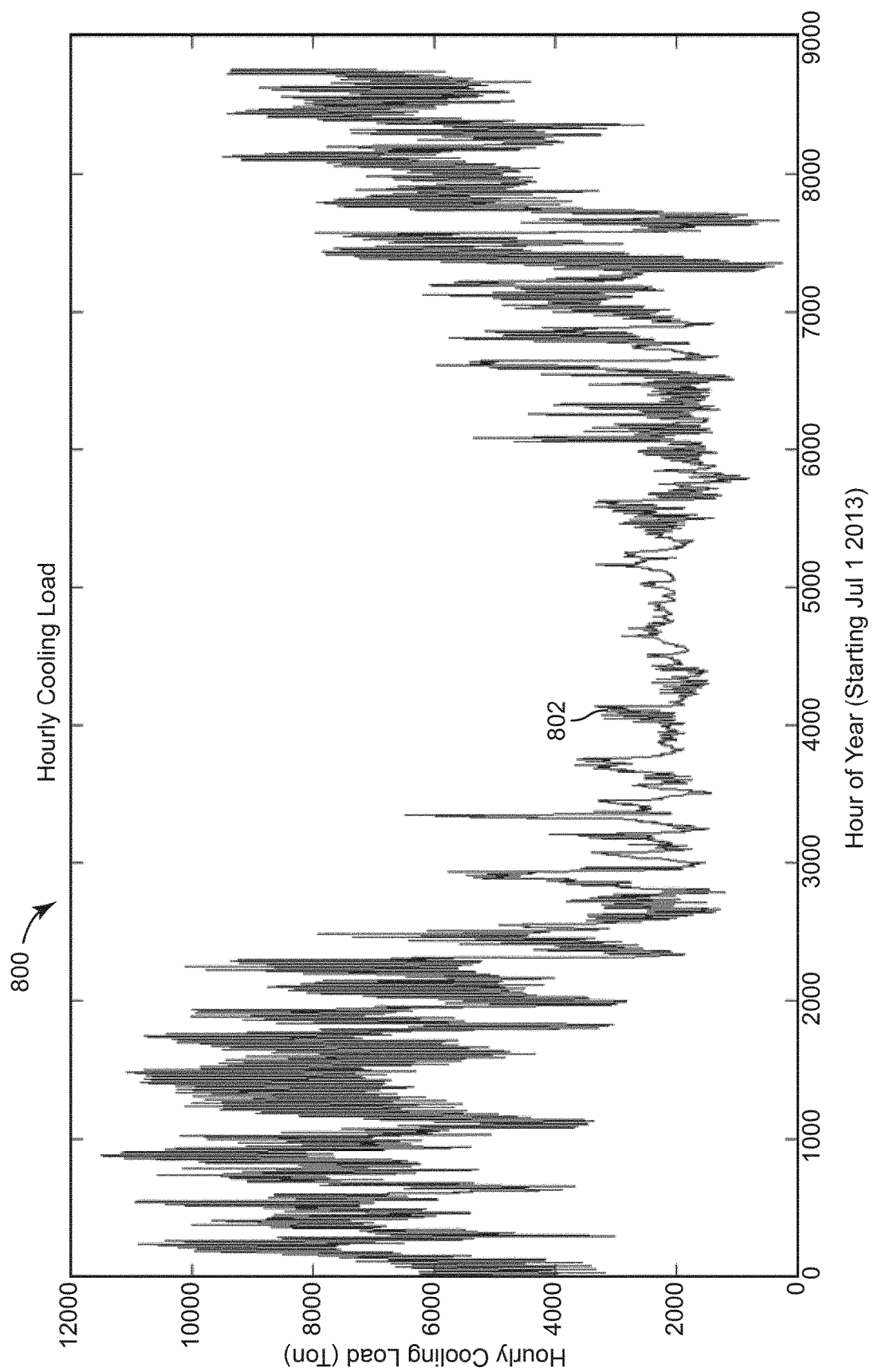
FIG. 8 is a graph of the results of the new load estimation method of FIG. 5, according to an exemplary embodiment.

Referring now to FIG. 8, results 800 of the new estimation method of FIG. 5 are shown, according to an exemplary embodiment. Results 800 show the estimated hourly cooling loads for an exemplary model based on an input of a daily cooling load in curve 802. Results 800 are shown for the period of time beginning with Jul. 1, 2013 and ending on Jun. 30, 2014. Plotting the estimated hourly data shows the peak hourly cooling load is approximately 11,500 tons refrigeration, in this particular embodiment. In this illustrative implementation, the peak hourly cooling load of approximately 11,500 tons refrigeration is below the plant capacity, which is 12,350 tons refrigeration. The bounding of the estimated cooling load within plant capacity may be an indicator that the new estimation method accurately tracked the cooling load.

Figure 9:
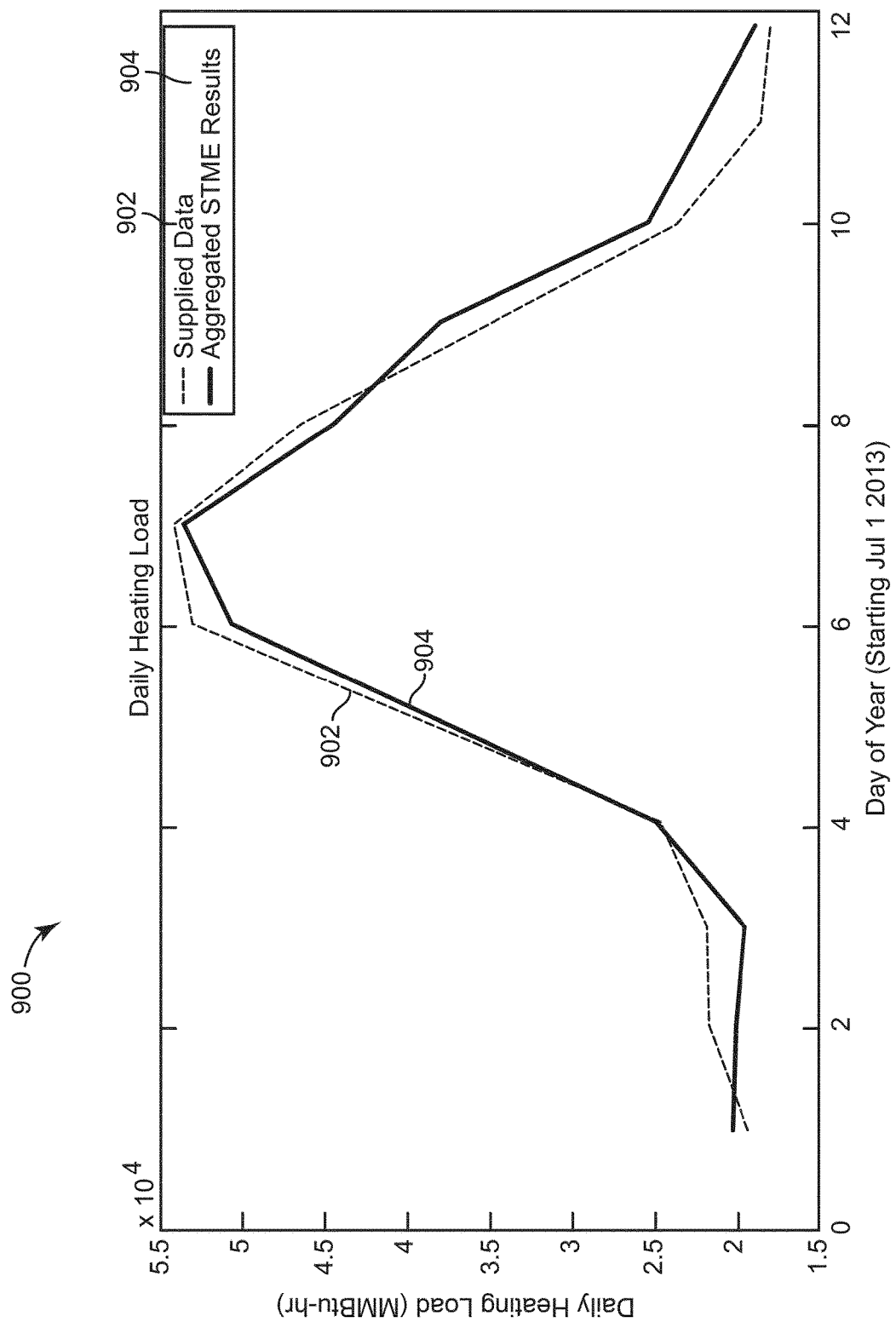
FIG. 9 is a graph of a comparison of the results of the new load estimation method of FIG. 5 with the supplied building energy load data, according to another exemplary embodiment.

Referring now to FIG. 9, a graph of a comparison 900 of the results of the new load estimation method of FIG. 5 with the supplied building energy load data is shown, according to another exemplary embodiment. The supplied data is represented by curve 902 and is plotted against the estimated heating loads represented by curve 904. Comparison 900 is shown for the period of time beginning with Jul. 1, 2013 and ending on Jun. 30, 2014. In this exemplary embodiment, the supplied heating load data was collected at a monthly sample rate. The new estimation method of FIG. 5 estimated hourly data to fit the weather trends. In this particular embodiment, a constraint on the heating load regression to prevent the hourly heating load from exceeding the plant capacity prevented the regression from reaching the global optimal solution, introducing error. Error in the heating load regression may not be as significant as error in the cooling load regression, because the fuel consumed by the hot water generators is natural gas, which has no associated demand charge (only a usage charge). In some embodiments, if the estimated hot load for the year is the same as the supplied hot load for the year, the total predicted energy usage can be estimated to be the same as the supplied data. In this particular embodiment, the summation of the estimated data is exactly 100% of the supplied data.

Figure 10:
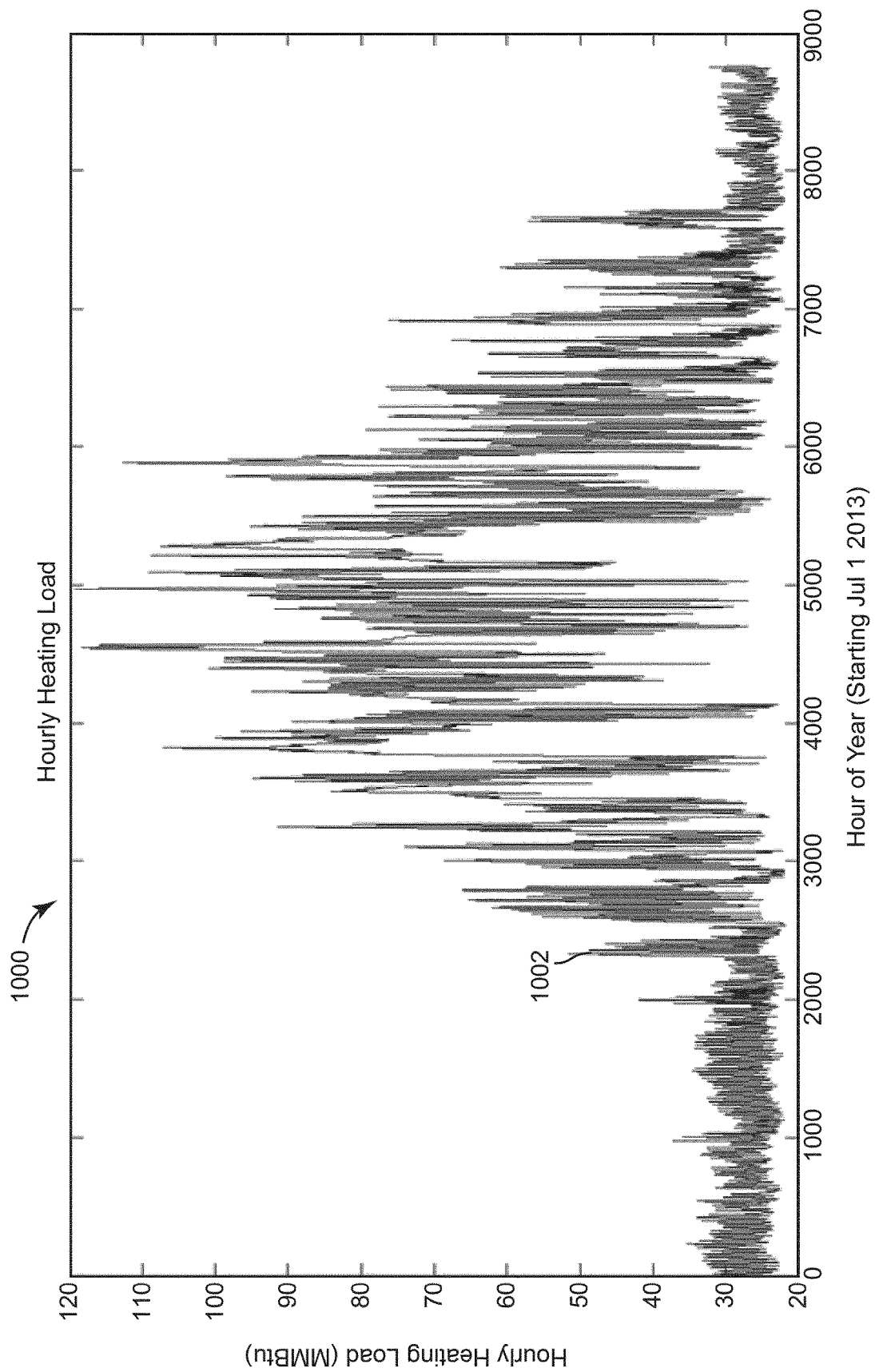
FIG. 10 is a graph of the results of the new load estimation method of FIG. 5, according to another exemplary embodiment.

Referring now to FIG. 10, results 1000 of the estimated building energy loads are shown, according to an exemplary embodiment. Results 1000 show the estimated hourly heating loads for an exemplary model based on an input of a monthly heating load in curve 1002. Results 1000 are shown for the period of time beginning with Jul. 1, 2013 and ending on Jun. 30, 2014. In this exemplary embodiment, the supplied heating load data was collected at a monthly sample rate. The new estimation method of FIG. 5 estimated hourly data to fit the weather trends. Results 100 show the effects of the inequality constraint discussed in the description of FIG. 4 when applied to the heating load model. The peak value of the hourly heating load is about 120 MMBTU, which is the total current plant capacity in this particular embodiment.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for operating equipment to control a production or consumption of a resource, the system comprising:
a processing circuit configured to:
identify a predicted cumulative production or consumption of a resource for a future time period and sample values of a plurality of predictor variables that affect the production or consumption of the resource at a plurality of times within the future time period;
aggregate the values of the plurality of predictor variables to generate an aggregated value for each of the plurality of predictor variables over the future time period;
generate a model that estimates the production or consumption in terms of the predictor variables based on the cumulative production or consumption of the resource and the aggregated values for each of the plurality of predictor variables;
input, to the model, the values of the plurality of predictor variables sampled at each of the plurality of times within the future time period to estimate a production or consumption of the resource at each of the plurality of times within the future time period such that the predicted cumulative production or consumption of the resource for the future time period is disaggregated into a plurality of estimated productions or consumptions of the resource within the future time period; and a controller configured to operate equipment using the estimated productions or consumptions of the resource at each of the plurality of times.

2. The system of claim 1, wherein the processing circuit is further configured to:

determine a number of the plurality of times that occur within the future time period; and sum each of the values of the plurality of predictor variables sampled during the number of the plurality of times to aggregate the plurality of predictor variable values.

3. The system of claim 1, wherein the processing circuit is further configured to select the predictor variables based on an effect of each of the predictor variables on the production or consumption of the resource.

4. The system of claim 1, wherein the processing circuit is further configured to generate a regression model based on the predicted cumulative productions or consumptions of the resource identified.

5. The system of claim 1, wherein the production or consumption of the resource is a heating load.

6. The system of claim 5, wherein the time period is one month.

7. The system of claim 1, wherein the production or consumption of the resource is a cooling load.

8. The system of claim 7, wherein the future time period is one day.

9. A method for operating equipment to control a production or consumption of a resource, the method comprising:

identifying a predicted cumulative production or consumption of a resource for a future time period and sampling values of a plurality of predictor variables that affect the production or consumption of the resource at a plurality of times within the future time period;

aggregating the values of the plurality of predictor variables to generate an aggregated value for each of the plurality of predictor variables over the future time period;

generating a model that estimates the production or consumption in terms of the predictor variables based on the cumulative production or consumption of the resource and the aggregated values for each of the plurality of predictor variables;

inputting, to the model, the values of the plurality of predictor variables sampled at each of the plurality of times within the future time period to estimate a production or consumption of the resource at each of the plurality of times within the future time period such that the predicted cumulative production or consumption of the resource for the future time period is disaggregated into a plurality of estimated productions or consumptions of the resource within the future time period; and operating equipment using the estimated productions or consumptions of the resource at each of the plurality of times.

10. The method of claim 9, wherein aggregating the values of the plurality of predictor variables comprises:

determining a number of the plurality of times that occur within the future time period; and summing each of the values of the plurality of predictor variables sampled during the number of the plurality of times.

11. The method of claim 9, further comprising selecting the predictor variables based on an effect of each of the predictor variables on the productions or consumptions of the resource.

12. The method of claim 9, further comprising performing a regression process to generate a model based on the predicted cumulative productions or consumptions of the resource identified.

13. The method of claim 9, wherein the production or consumption of the resource is a heating load.

14. The method of claim 13, wherein the future time period is one month.

15. The method of claim 9, wherein the production or consumption of the resource is a cooling load.

16. The method of claim 15, wherein the future time period is one day.

17. A processing circuit for operating equipment to control a production or consumption of a resource, the processing circuit configured to:

identify a predicted cumulative production or consumption of a resource for a future time period and sample values of a plurality of predictor variables that affect the production or consumption of the resource at a plurality of times within the future time period;

aggregate the values of the plurality of predictor variables to generate an aggregated value for each of the plurality of predictor variables over the future time period;

generate a model that estimates the production or consumption in terms of the predictor variables based on the cumulative production or consumption of the resource and the aggregated values for each of the plurality of predictor variables;

input, to the model, the values of the plurality of predictor variables sampled at each of the plurality of times within the future time period to estimate a production or consumption of the resource at each of the plurality of times within the future time period such that the predicted cumulative production or consumption of the resource for the future time period is disaggregated into a plurality of estimated productions or consumptions of the resource within the future time period; and operate equipment using the estimated productions or consumptions of the resource at each of the plurality of times.

18. The processing circuit of claim 17, wherein the processing circuit is further configured to:

determine a number of the plurality of times that occur within the future time period; and sum each of the values of the plurality of predictor variables sampled during the number of the plurality of times to aggregate the plurality of predictor variable values.

19. The processing circuit of claim 17, wherein the processing circuit is further configured to select the predictor variables based on an effect of each of the predictor variables on the productions or consumptions of the resource.

20. The processing circuit of claim 17, wherein the processing circuit is further configured to generate a regression model based on the predicted cumulative productions or consumptions of the resource identified.

* * * * *